(12) United States Patent
Sastry et al.

(10) Patent No.: US 9,058,471 B2
(45) Date of Patent: Jun. 16, 2015

(54) AUTHORIZATION SYSTEM FOR HETEROGENEOUS ENTERPRISE ENVIRONMENTS

(71) Applicant: Oracle International Corporation, Redwood Shores, CA (US)

(72) Inventors: Hari VN. Sastry, San Jose, CA (US); Sirish V Vepa, Foster City, CA (US); Uppili Srinivasan, Fremont, CA (US); Vrinda S. Joshi, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 43 days.

(21) Appl. No.: 13/838,113

(22) Filed: Mar. 15, 2013

(65) Prior Publication Data

US 2013/0332984 A1    Dec. 12, 2013

Related U.S. Application Data

(60) Provisional application No. 61/657,648, filed on Jun. 8, 2012.

(51) Int. Cl.
*H04L 29/06* (2006.01)
*G06F 21/30* (2013.01)
(Continued)

(52) U.S. Cl.
CPC ............ *G06F 21/30* (2013.01); *G06F 21/00* (2013.01); *G06F 21/6236* (2013.01)

(58) Field of Classification Search
CPC . G06F 21/30; G06F 21/6227; G06F 21/6236; G06F 21/629
USPC .................................................. 726/1, 4, 30
See application file for complete search history.

(56) References Cited

U.S. PATENT DOCUMENTS 6,052,684 A    4/2000  Du
6,085,188 A    7/2000  Bachmann et al.
(Continued)

FOREIGN PATENT DOCUMENTS

WO    WO2010/149222    12/2010
WO       2014039772       3/2014
(Continued)

OTHER PUBLICATIONS

Jahid et al, MyABDAC: Compiling XACML Policies for Attribute-Based Database Access Control, Feb. 23, 2011, ACM, pp. 97-108.*
(Continued)

*Primary Examiner* — Luu Pham
*Assistant Examiner* — Jenise Jackson
(74) *Attorney, Agent, or Firm* — Kilpatrick Townsend & Stockton LLP

(57) ABSTRACT

A unified authorization system for an enterprise that includes heterogeneous access control environments is provided. Components in the enterprise utilizing either Java Platform Security (JPS) or Oracle Access Manager (OAM) can both use the unified authorization system to perform authorization. A common policy store can contain policies applicable to diverse components in a canonical form conducive to varieties of access control models. The data model used within the common policy store can support access control features found in both role-based policies and delegable access control administration. The common policy store can enable the querying and retrieval of authorization policies that are based on various access control models. A unified administrator interface permits administrators of applications following any kind of access control model to administer policies for resources. A unified policy decision engine can evaluate whether authorization policies are satisfied, regardless of the access control models that those policies follow.

15 Claims, 9 Drawing Sheets

(51) Int. Cl.
*G06F 21/00* (2013.01)
*G06F 21/62* (2013.01)

(56) References Cited

U.S. PATENT DOCUMENTS

| | | |
|---|---|---|
| 6,236,988 B1 | 5/2001 | Aldred |
| 6,516,416 B2 | 2/2003 | Gregg et al. |
| 6,526,513 B1 | 2/2003 | Shrader et al. |
| 6,553,364 B1 | 4/2003 | Wu |
| 7,051,039 B1 | 5/2006 | Murthy et al. |
| 7,136,867 B1 | 11/2006 | Chatterjee et al. |
| 7,290,288 B2 | 10/2007 | Gregg et al. |
| 7,664,866 B2 | 2/2010 | Wakefield |
| 7,953,896 B2 | 5/2011 | Ward et al. |
| 7,992,194 B2 | 8/2011 | Damodaran et al. |
| 8,095,629 B2 | 1/2012 | Ward et al. |
| 8,151,323 B2 | 4/2012 | Harris et al. |
| 8,387,136 B2 | 2/2013 | Lee et al. |
| 8,387,137 B2 | 2/2013 | Lee et al. |
| 8,402,514 B1 | 3/2013 | Thompson et al. |
| 8,434,129 B2 | 4/2013 | Kannappan et al. |
| 8,572,602 B1 | 10/2013 | Colton et al. |
| 8,631,477 B2 | 1/2014 | Chen et al. |
| 8,631,478 B2 | 1/2014 | Chen et al. |
| 8,769,622 B2 | 7/2014 | Chang et al. |
| 8,769,704 B2 | 7/2014 | Peddada et al. |
| 8,789,157 B2 | 7/2014 | Sinn |
| 8,843,997 B1 | 9/2014 | Hare |
| 2002/0059210 A1 | 5/2002 | Makus et al. |
| 2002/0095395 A1 | 7/2002 | Larson et al. |
| 2004/0215610 A1 | 10/2004 | Dixon et al. |
| 2006/0059539 A1* | 3/2006 | Shashikumar et al. ............ 726/1 |
| 2006/0143704 A1* | 6/2006 | Rits et al. ......................... 726/17 |
| 2006/0277595 A1 | 12/2006 | Kinser et al. |
| 2007/0005536 A1 | 1/2007 | Caswell et al. |
| 2007/0028098 A1 | 2/2007 | Baartman et al. |
| 2007/0055602 A1 | 3/2007 | Mohn |
| 2007/0169168 A1* | 7/2007 | Lim ................................. 726/1 |
| 2007/0282942 A1 | 12/2007 | Bailey et al. |
| 2007/0283147 A1 | 12/2007 | Fried et al. |
| 2008/0080718 A1 | 4/2008 | Meijer et al. |
| 2008/0083036 A1 | 4/2008 | Ozzie et al. |
| 2008/0089520 A1 | 4/2008 | Keszler |
| 2008/0147584 A1* | 6/2008 | Buss ................................ 706/47 |
| 2008/0189250 A1* | 8/2008 | Cha et al. ......................... 707/3 |
| 2008/0313716 A1 | 12/2008 | Park |
| 2009/0126007 A1 | 5/2009 | Zamberlan et al. |
| 2009/0178102 A1* | 7/2009 | Alghathbar et al. .............. 726/1 |
| 2009/0205018 A1* | 8/2009 | Ferraiolo et al. .................. 726/1 |
| 2009/0240728 A1 | 9/2009 | Shukla et al. |
| 2009/0265753 A1 | 10/2009 | Anderson et al. |
| 2009/0320093 A1 | 12/2009 | Glazier et al. |
| 2010/0145718 A1 | 6/2010 | Elmore et al. |
| 2010/0306818 A1* | 12/2010 | Li et al. ........................... 726/1 |
| 2011/0040793 A1 | 2/2011 | Davidson et al. |
| 2011/0053555 A1 | 3/2011 | Cai et al. |
| 2011/0112939 A1 | 5/2011 | Nelson et al. |
| 2011/0126207 A1 | 5/2011 | Wipfel et al. |
| 2011/0131146 A1 | 6/2011 | Skutnik |
| 2011/0138051 A1 | 6/2011 | Dawson et al. |
| 2011/0307523 A1 | 12/2011 | Balani et al. |
| 2011/0313902 A1 | 12/2011 | Liu et al. |
| 2011/0314466 A1 | 12/2011 | Berg et al. |
| 2012/0005341 A1 | 1/2012 | Seago et al. |
| 2012/0131194 A1 | 5/2012 | Morgan |
| 2012/0136936 A1 | 5/2012 | Quintuna |
| 2012/0221454 A1 | 8/2012 | Morgan |
| 2012/0226796 A1 | 9/2012 | Morgan |
| 2012/0226808 A1 | 9/2012 | Morgan |
| 2012/0297441 A1 | 11/2012 | Boldyrev et al. |
| 2012/0304191 A1 | 11/2012 | Morgan |
| 2012/0311154 A1 | 12/2012 | Morgan |
| 2013/0047230 A1 | 2/2013 | Krishnan et al. |
| 2013/0086060 A1 | 4/2013 | Donley et al. |
| 2013/0086065 A1 | 4/2013 | Sharma et al. |
| 2013/0086210 A1 | 4/2013 | Yiu et al. |
| 2013/0086211 A1 | 4/2013 | Sondhi et al. |
| 2013/0086628 A1 | 4/2013 | Kottahachchi et al. |
| 2013/0086639 A1 | 4/2013 | Sondhi et al. |
| 2013/0086658 A1 | 4/2013 | Kottahachchi et al. |
| 2013/0086669 A1 | 4/2013 | Sondhi et al. |
| 2013/0204994 A1 | 8/2013 | Deshmukh et al. |
| 2013/0212160 A1 | 8/2013 | Lawson et al. |
| 2013/0212420 A1 | 8/2013 | Lawson et al. |
| 2013/0254882 A1 | 9/2013 | Kannappan et al. |
| 2013/0268480 A1 | 10/2013 | Dorman |
| 2013/0268491 A1 | 10/2013 | Chung et al. |
| 2013/0275509 A1 | 10/2013 | Micucci et al. |
| 2013/0290710 A1 | 10/2013 | Broder et al. |
| 2013/0298212 A1 | 11/2013 | Shah et al. |
| 2013/0332985 A1* | 12/2013 | Sastry et al. ...................... 726/1 |
| 2014/0020054 A1* | 1/2014 | Lim ................................. 726/1 |
| 2014/0059002 A1 | 2/2014 | Lockhart et al. |
| 2014/0074539 A1 | 3/2014 | Doering et al. |
| 2014/0074540 A1 | 3/2014 | Evans et al. |
| 2014/0074544 A1 | 3/2014 | Seetharam et al. |
| 2014/0074659 A1 | 3/2014 | Chatterjee et al. |
| 2014/0074788 A1 | 3/2014 | Chatterjee et al. |
| 2014/0074793 A1 | 3/2014 | Doering et al. |
| 2014/0074999 A1 | 3/2014 | Khalsa et al. |
| 2014/0075016 A1 | 3/2014 | Chatterjee et al. |
| 2014/0075027 A1 | 3/2014 | Chatterjee et al. |
| 2014/0075031 A1 | 3/2014 | Doering et al. |
| 2014/0075032 A1 | 3/2014 | Vasudevan et al. |
| 2014/0075033 A1 | 3/2014 | Doering et al. |
| 2014/0075034 A1 | 3/2014 | Vasudevan et al. |
| 2014/0075239 A1 | 3/2014 | Prathipati et al. |
| 2014/0075499 A1 | 3/2014 | Arun et al. |
| 2014/0075501 A1 | 3/2014 | Srinivasan et al. |
| 2014/0075565 A1 | 3/2014 | Srinivasan et al. |
| 2014/0141743 A1 | 5/2014 | Shaw |
| 2014/0143083 A1 | 5/2014 | Prathipati et al. |
| 2014/0280943 A1 | 9/2014 | Bobrov et al. |

FOREIGN PATENT DOCUMENTS

| | | |
|---|---|---|
| WO | 2014039882 | 3/2014 |
| WO | 2014039918 | 3/2014 |
| WO | 2014039919 | 3/2014 |
| WO | 2014039921 | 3/2014 |

OTHER PUBLICATIONS

Emig et al, An Access Control Metamodel for Web Service-Oriented Architecture, 2007, IEEE, pp. 1-8.*

International Patent Application No. PCT/US2013/058639, International Search Report and Written Opinion, mailed Jan. 8, 2014, 10 pages.

International Patent Application No. PCT/US2013/058642, International Search Report and Written Opinion, mailed Feb. 7, 2014, 17 pages.

International Patent Application No. PCT/US2013/058638, International Search Report and Written Opinion, mailed Jan. 8, 2014, 11 pages.

International Patent Application No. PCT/US2013/058596, International Search Report and Written Opinion, mailed Nov. 22, 2013, 9 pages.

"Basic Traversals," The Neo4J Manual, Neo Technology, Inc. (copyright 2012) 7 pages.

"LDAP Authentication Overview," Juniper Networks, Inc. (copyright 1999-2010) 4 pages.

"Using ldapsearch," *Red Hat Directory Server 8.2 Administration Guide for managing Directory Server instances Edition 8.2.8*, Red Hat, Inc. (copyright 2010) 3 pages.

Afgan et al. "CloudMan as a Tool Execution Framework for the Cloud," IEEE Proceedings of The 35th International Convention on Information and Communication Technology, Electronics and Microelectronics (MIPRO 2012), pp. 437-441 (2012).

Bastos et al. "Towards a Cloud-Based Environment for Space Systems Concept Design," IEEE International Conference on Information Society (I-SOCIETY), pp. 478-483 (2012).

(56) References Cited

OTHER PUBLICATIONS

Hunter "LDAP Searching—Setting the SCOPE Parameters," available at http://www.idevelopment.info/data/LDAP/LDAP_Resources/SEARCH_Setting_the_SCOPE_Parameter.shtml (copyright 1998-2013) 2 pages.
Paul et al. "Architectures for the future networks and the next generation Internet: A survey ," Computer Communications 34:2-42 (2011).
Demarest et al., Oracle Cloud Computing, An Oracle White Paper, Oracle Corporation, Redwood Shores, CA, May 2010, 22 pages.
U.S. Appl. No. 13/842,269, Non Final Office Action mailed on Jun. 5, 2014, 12 pages.
International Application No. PCT/US2013/058642, Invitation to restrict or pay additional fees mailed on Jul. 23, 2014, 3 pages.
Teger, "Oracle Fusion Middleware Developer's Guide for Oracle Entitlements Server", Oracle, 11g Release 1, E27154-01, Retrieved from the Internet: URL: http://docs.oracle.com/cd/E27559_01/dev.1112/e27154/handle_auth_calls.htm on Oct. 1, 2013, Jul. 2012, 132 pages.
An Introduction to Role-Based Access Control, NIST/ITL Bulletin, Retrieved from the Internet: URL: http://csrc.nist.gov/groups/SNS/rbac/documents/design_implementation/Intro_role_based_access.htm on Oct. 22, 2013, Dec. 1995, 5 pages.
Oracle Internet Directory Administrator's Guide: Introduction to LDAP and Oracle Internet Directory, Oracle, 10g Release 2, B14082-02, Retrieved from the Internet: URL: http://docs.oracle.com/cd/B14099_19/idmanage.1012/b14082/intro.htm on Oct. 1, 2013, 1999, 9 pages.
XACML v3.0 Hierarchical Resource Profile Version 1.0, Oasis, Working Draft 7, Retrieved from the Internet: URL: http://xml.coverpages.org/XACML-v30-HierarchicalResourceProfile-WD7.pdf on Aug. 29, 2013, Apr. 1, 2009, 22 pages.
U.S. Appl. No. 13/485,372, Non-Final Office Action, mailed Feb. 28, 2013, 14 pages.
Anthony et al., "Consolidation Best Practices: Oracle Database 12c plugs you into the cloud", Oracle White Paper, Retrieved from the Internet: URL: http://www.oracle.com/us/products/database-private-cloud-wp-360048.pdf on Oct. 1, 2013, Jul. 2013, 30 pages.
Bierman et al., "Network Configuration Protocol (NETCONF) Access Control Model", Internet Engineering Task Force, RFC 6536, Retrieved from the Internet: URL: http://tools.ietf.org/html/rfc6536 on Aug. 29, 2013, Mar. 2012, 50 pages.
Chanliau et al., "Oracle Fusion Middleware: Orcale Platform Security Services (OPSS) FAQ", Oracle, Retrieved from the Internet: URL: http://www.oracle.com/technetwork/testcontent/opss-faq-131489.pdf on Oct. 1, 2013, Jul. 2010, 6 pages.
Chiba et al., "Dynamic Authorization Extension to Remote Authentication Dial In User Service (RADIUS)", Network Working Group, RFC 5176, Retrieved from the Internet: URL: http://tools.ietf.org/html/rfc5176 on Aug. 29, 2013, Jan. 2008, 35 pages.
Clemm et al., "Web Distributed Authoring and Versioning (WebDAV) Access Control Protocol", Network Working Group, RFC 3744, Retrieved from the Internet: URL: http://www.ietf.org/rfc/rfc3744.txt on Aug. 29, 2013, May 2004, 66 pages.
Datta et al., "Oracle Fusion Middleware Developer's Guide for Oracle Identity Manager", Oracle, 11g Release 2, E27150-08, Retrieved from the Internet: URL: http://docs.oracle.com/cd/E37115_01/dev.1112/e27150/toc.htm on Oct. 1, 2013, Sep. 2013, 1102 pages.
International Patent Application No. PCT/US2013/058426, International Search Report and Written Opinion, mailed Nov. 8, 2013, 9 pages.
Subi et al., "Oracle Fusion Middleware Application Security Guide", Oracle, 11g Release 1, E10043-09, Retrieved from the Internet: URL: http://docs.oracle.com/cd/E21764_01/core.1111/e10043/underjps.htm on Oct. 1, 2013, May 2011, 834 pages.
Teger et al., "Oracle Fusion Middleware Developer's Guide for Oracle Access Management", Oracle, 11g Release 2, E27134-06, Retrieved from the Internet: URL: http://docs.oracle.com/cd/E37115_01/dev.1112/e27134/toc.htm on Oct. 1, 2013, Jul. 2013, 372 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
U.S. Appl. No. 13/838,813, Final Office Action mailed on Dec. 4, 2014, 24 pages.
U.S. Appl. No. 13/840,943, Non-Final Office Action mailed on Dec. 18, 2014, 10 pages.
U.S. Appl. No. 13/842,269, Notice of Allowance mailed on Nov. 3, 2014, 8 pages.
U.S. Appl. No. 13/842,833, Notice of Allowance mailed on Dec. 15, 2014, 11 pages.
U.S. Appl. No. 13/907,689, Non-Final Office Action mailed on Jan. 7, 2015, 11 pages.
U.S. Appl. No. 14/019,051, Non-Final Office Action mailed on Nov. 20, 2014, 5 pages.
U.S. Appl. No. 13/838,537, Non-Final Office Action mailed on Sep. 11, 2014, 22 pages.
U.S. Appl. No. 13/838,813, Non-Final Office Action mailed on Aug. 14, 2014, 22 pages.
International Application. No. PCT/US2013/058426, Written Opinion mailed on Aug. 19, 2014, 7 pages.
International Application. No. PCT/US2013/058596, Written Opinion mailed on Aug. 19, 2014, 6 pages.
International Application. No. PCT/US2013/058642, Written Opinion mailed on Sep. 11, 2014, 8 pages.

* cited by examiner

AUTHORIZATION SYSTEM FOR HETEROGENEOUS ENTERPRISE ENVIRONMENTS

CROSS-REFERENCE TO RELATED APPLICATIONS

The present application claims priority under 35 U.S.C. 119(e) to U.S. Provisional Patent Application No. 61/657,648, filed Jun. 8, 2012, titled AUTHORIZATION SYSTEM FOR HETEROGENEOUS ENTERPRISE ENVIRONMENTS, the entire contents of which are incorporated herein by reference for all purposes. The present application is also related to U.S. patent application Ser. No. 13/838,537, filed Mar. 15, 2013, titled OBLIGATION SYSTEM FOR ENTERPRISE ENVIRONMENTS.

BACKGROUND

The disclosure below relates generally to computer security, and more specifically to access control within an enterprise that contains various access control environments.

In the field of computer security, general access control includes authorization, authentication, access approval, and audit. Access control involves access approval, whereby a computing system makes a decision to grant or reject an access request from an already authenticated subject, based on what the subject is authorized to access. Authentication and access control are often combined into a single operation, so that access is approved based on successful authentication, or based on an anonymous access token. Authentication methods and tokens may include passwords, biometric scans, physical keys, electronic keys and devices, hidden paths, social barriers, and monitoring by humans and automated systems.

In an access control model, the entities that can perform actions in the system are usually called subjects, and the entities representing resources to which access may need to be controlled are usually called objects. Subjects and objects may be software entities rather than human users. In some models, such as the object-capability model, a software entity can potentially act as both a subject and object. Objects can include computing system resources (referred to herein briefly as "resources") such as executable application programs (referred to herein briefly as "applications"), file system structures such as files and directories, communication ports, volatile memory segments, etc.

Access control models used by current systems can be based upon capabilities or upon access control lists (ACLs). In a capability-based model, holding an unforgettable reference or capability to an object provides access to the object (roughly analogous to how possession of a house key grants one access to his house); access is conveyed to another party by transmitting such a capability over a secure channel. In an ACL-based model, a subject's access to an object can depend on whether its identity is on a list associated with the object (roughly analogous to how a bouncer at a private party would check one's ID to see whether his name is was the guest list); access can be conveyed by editing the list. Both capability-based and ACL-based models can include mechanisms to allow access rights to be granted to all members of a group of subjects. Such a group itself can be modeled as a subject.

Access control systems can provide the services of authorization, identification and authentication, access approval, and accountability. Authorization involves specifying the actions that a subject is permitted to perform. Identification and authentication prevents illegitimate subjects from accessing a system. Access approval involves granting access during operations, by associating users with the resources that they are allowed to access based on an authorization policy. Accountability identifies the actions that a subject performed.

Authorization can involve defining access rights for subjects. An authorization policy can specify the operations that subjects are allowed to perform within a system. Some operating systems implement authorization policies as formal sets of permissions that are variations or extensions of three basic types of access. With read access, a subject can read file contents and list directory contents. With write access, a subject can change the contents of a file or directory by adding data to an existing file structure, creating a new file structure, deleting an existing file structure, or renaming an existing file structure. With execute access, a subject can cause the system to execute (run) a program. These rights and permissions can be implemented differently in systems having different access control models. Access control models are sometimes categorized as being either discretionary or non-discretionary. Some widely recognized models include discretionary access control (DAC), mandatory access control (MAC), role-based access control (RBAC), and attribute-based access control (ABAC).

In attribute-based access control (ABAC), access is granted not necessarily based on the rights of the subject associated with a user after authentication, but based on attributes of the user himself. The user can be asked to satisfy, to an access control engine, claims about his attributes. An attribute-based access control policy specifies which claims need to be satisfied in order to grant access to an object. For example, the claim could be "older than 18." Under such circumstances, a user that could prove this claim would be granted access. Under this model, users can be anonymous because authentication and identification are not strictly required. Means for proving claims anonymously can be achieved using anonymous credentials. Extensible Access Control Markup Language (XACML) is a standard for attribute-based access control.

Discretionary access control (DAC) involves a policy determined by the owner of an object. The owner decides which users are allowed to access the object and what privileges those users have with respect to the object. In a DAC-based system, each object in the system can have an owner. In some DAC-based systems, each object's initial owner can be the subject that caused that object to be created. The access policy for an object can be determined by that object's owner. In a DAC-based system, an owner can assign access rights and permissions for specific resources such as to other subjects.

Mandatory access control (MAC) involves allowing a user to access a resource if rules exist that allow that user to access that resource. Management of a MAC-based system can be simplified when the objects are protected using hierarchical access control, and/or through the implementation of sensitivity labels. In a system using sensitivity labels, a separate sensitivity label can be assigned to each subject and object. A subject's sensitivity label can specifies its level of trust. An object's sensitivity label can specify the level of trust required to access that object. A subject is permitted to access an object if the subject's sensitivity level is equal to or greater than the level of trust required by the object. MAC-based system can use rule-based access control. Rule-based control can involve determining whether a subject should be granted or denied access to an object by comparing the object's sensitivity label to the subject's sensitivity label.

Role-based access control (RBAC) can involve an access policy determined by a system in which an object exists.

RBAC systems can be non-discretionary, in that access can be controlled at the system level (by a system administrator instead of by an object's owner. RBAC systems can control collections of permissions. A role in an RBAC system can be viewed as a set of permissions. In an RBAC system, a subject can access a resource if the subject has been assigned a role that is permitted to access that resource. Roles can be combined in a hierarchy in which higher-level roles subsume permissions owned by sub-roles.

Challenges may arise in an enterprise that involves heterogeneous authorization (or access control) environments. Such heterogeneous authorization environments may employ disparate access control models. An enterprise might, for example, involve some components that employ Java Platform Security (JPS) as an authorization environment and other components that employ Oracle Access Manager (OAM) as an authorization environment. The access controls provided by JPS can be application-specific; such access controls can be implemented within applications by the designers of those applications, often with a deployment in a specific type of enterprise—often one that is expected to use the RBAC model enterprise-wide—in mind. Thus, the JPS access controls that application designers incorporate into their applications can be role-based. In contrast, the access controls provided by OAM can be enterprise-wide (generally applicable rather than specific to any particular application), and specified at application deployment time rather than at application design time. The access controls provided by OAM can be based on a DAC-based model that permits policy administration to be delegated. Implementing both types of systems in a separate and segregated manner can be be wasteful of system resources and duplicative of efforts.

SUMMARY

Certain embodiments of the invention can provide a unified authorization system for an enterprise that includes heterogeneous access control environments.

For example, an enterprise that involves some components (e.g., applications) that utilize JPS and some components that utilize OAM can include such a unified authorization system. Components utilizing either JPS or OAM can both use the unified authorization system to perform authorization (among potentially other access control functions). The unified authorization system can include a common policy store in which authorization policies applicable to such diverse components can be stored in a canonical form that is conducive to a variety of different access control models (e.g., both DAC and RBAC). Thus, different authorization policies based on different models do not need to be stored separately in different data formats; each authorization policy can be stored in a unified data format that conforms to a unified schema that is capable of specifying characteristics of different authorization policies that are based on a variety of different access control models. The data model used within the common policy store can support access control features found in both JSP and OAM environments, such as both role-based policies and delegable access control administration. The common policy store can enable the querying and retrieval of authorization policies that are based on a variety of different access control models. The unified authorization system can include a single unified administrator interface through which administrators of applications following any kind of access control model can administer policies for the resources they administer. The unified authorization system can include a single unified policy decision engine that can evaluate whether authorization policies are satisfied, regardless of the access control models that those policies follow. Thus, the separate implementation and duplication of such features for various different authorization environments (e.g., JSP and OAM) within a single enterprise can be avoided; instead, the authorization environments become united within the enterprise through the use of the unified authorization system.

In an embodiment, an authorization system that conforms to legacy access control models provides mechanisms whereby structures already existing within those legacy access control models can be used to pass additional information to (e.g., system time and/or other environmental variable) and from (e.g., requirements that an access-seeking application needs to perform) that authorization system. Because the authorization system conforms to the legacy model, legacy applications can still interact with the authorization system without modification. Because the authorization system also provides mechanisms whereby the existing structures can be used to pass the additional information, more advanced applications can make use of enhanced access control features of the authorization system. Such enhanced features can involve policy-based decisions that take into account the additional information in determining whether to permit resource access. Such enhanced features can involve the placement of policy-specified "obligations" (explained further below) within the existing structures to be returned back to the advanced applications. Such obligations can indicate requirements that those applications need to fulfill in conjunction with performing operations on resources.

DETAILED DESCRIPTION

Figure 1:
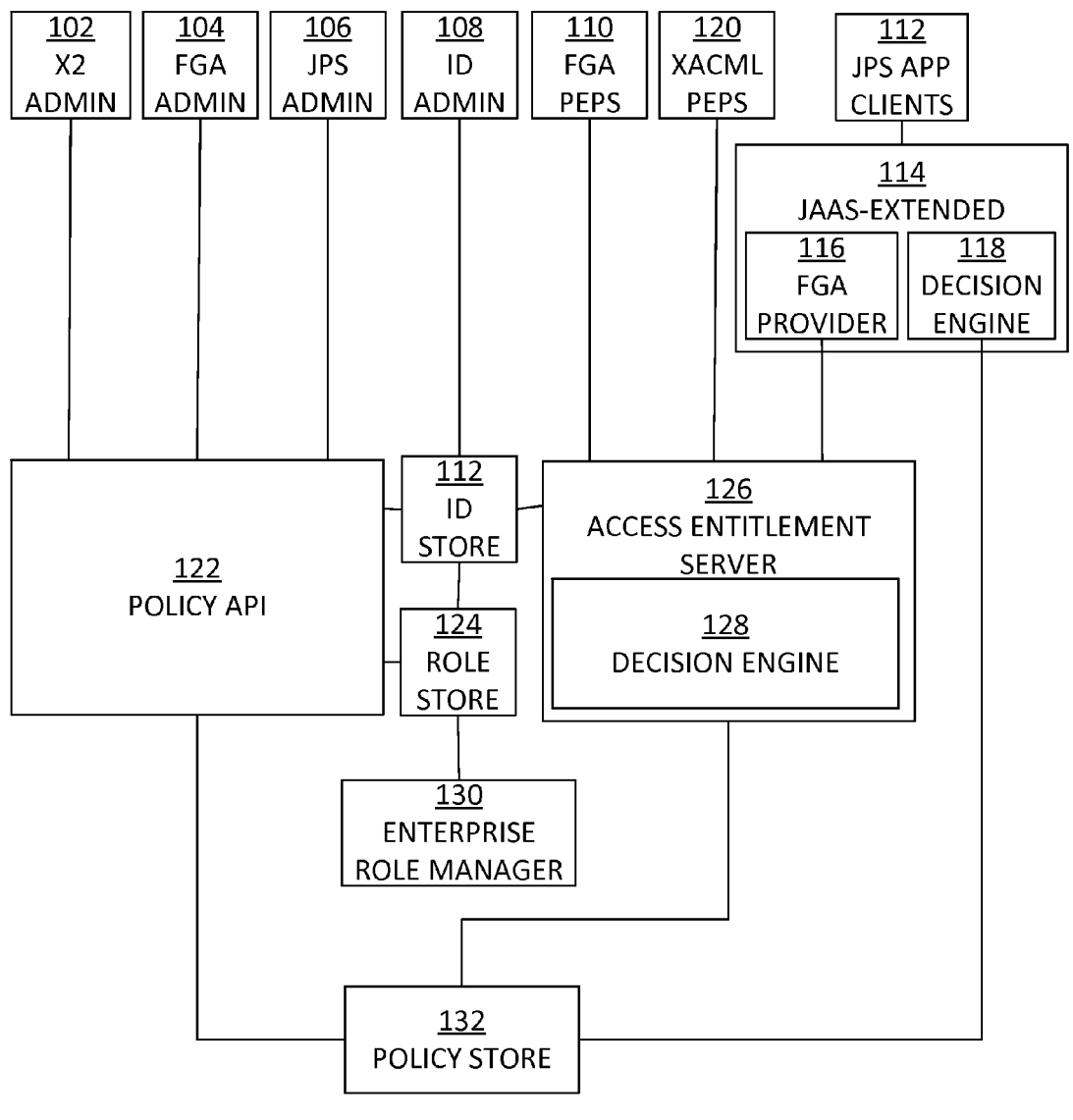
FIG. 1 is a block diagram that illustrates an example of a common authorization framework, according to an embodiment of the invention.

In the following description, for the purposes of explanation, specific details are set forth in order to provide a thorough understanding of embodiments of the invention. However, it will be apparent that the invention may be practiced without these specific details.

In an embodiment of the invention, a single unified authorization system provides authorization functions for a variety of components of an enterprise, even under circumstances in which those components were designed to function within different authorization environments. For example, the unified authorization system can provide authorization functions for applications that are designed to function within an authorization environment that conforms to an RBAC model and also for applications that are designed to function within an authorization environment that conforms to a DAC model. The unified authorization system can provide authorization functions for applications that are designed to function in connection with a JPS authorization environment and also for applications that are designed to function in connection with an OAM authorization environment. The unified authorization system can enable role-based authorization polices and can also enable the delegation of authorization administration from one subject (e.g., application or user) to another.

In an embodiment of the invention, the single unified authorization system can include a unified policy store that contains all authorization policies applicable to all resources within the enterprise. Thus, in an embodiment, the enterprise does not involve any authorization policies that are stored outside of the unified policy store. The unified policy store can store authorization policies in a canonical policy format that conforms to a unified policy schema. The unified policy schema can be specified such that policies of a variety of different types all can be stored as data objects that are formatted according to the canonical policy format. Regardless of whether a policy was originally specified within a JPS environment, an OAM environment, or some other type of authorization environment, that policy can be stored as an instance, or object, that conforms to the unified policy schema. The unified policy schema is flexible enough to accommodate features found in a variety of different authorization environments and used by a variety of different authorization policy models. As a result, in an embodiment, separate applications avoid the need to maintain their own separate policy stores, which can serve to reduce overlap in policy metadata and also to reduce duplication of programming efforts.

In an embodiment of the invention, the single unified authorization system can include a unified policy application programming interface (API). This unified policy API can be used by a variety of different authorization management system tools, regardless of the authorization policy model to which those tools conform, and regardless of the authorization environment type in connection with which those tools were designed to function. The unified policy API can expose interfaces for methods that perform functions featured in a variety of different access control models (e.g., RBAC, DAC, etc.). The unified policy API can expose interfaces for methods that perform functions featured in a variety of different authorization environments (e.g., JPS, OAM, etc.). For example, in an embodiment, the unified policy API can expose interfaces for methods that perform role-based authorization functions (e.g., assigning, to a specified user, a role that is associated with specified permissions) as well as interfaces for methods that permit the delegation of administrative capabilities (e.g., delegating, to another user, the ability to assign application-specific permissions to additional users). In an embodiment of the invention, the unified policy API also can be used by a policy decision engine (discussed below) to query authorization polices that are stored in the unified policy store discussed above, and to retrieve those authorization policies from the policy store. Because the authorization policies can be stored in a canonical data format regardless of the type of authorization environment to which those authorization policies were originally designed to apply, queries can be issued to the unified policy store via the unified policy API without specially accounting for such differing types of authorization environments; queries can be formatted using similar syntactical characteristics across the enterprise.

In an embodiment of the invention, the single unified authorization system can include a single unified policy decision engine. The policy decision engine can evaluate authorization policies queried and retrieved from the unified policy store (potentially through the unified policy API) in order to determine whether those authorization policies are satisfied. If the policy decision engine determines that an authorization policy is satisfied, then the policy decision engine can return an evaluation result that indicates that an application or user that sought access to a resource to which the policy was applicable may be granted that access. Conversely, if the policy decision engine determines that an authorization policy is unsatisfied, then the policy decision engine can return an evaluation result that indicates that an application or user that sought access to such a resource should be denied that access. In an embodiment of the invention, the policy decision engine can be capable of evaluating authorization policies that are formatted according to the canonical data format discussed above. Consequently, the policy decision engine can be capable of evaluating authorization policies that were originally applicable to various different authorization environments (e.g., JPS, OAM, etc.). Because of this capability of the unified policy decision engine, it is not necessary for the enterprise to contain a differently designed or differently implemented policy engine for each different type of authorization environment that exists within the enterprise.

Figure 9:
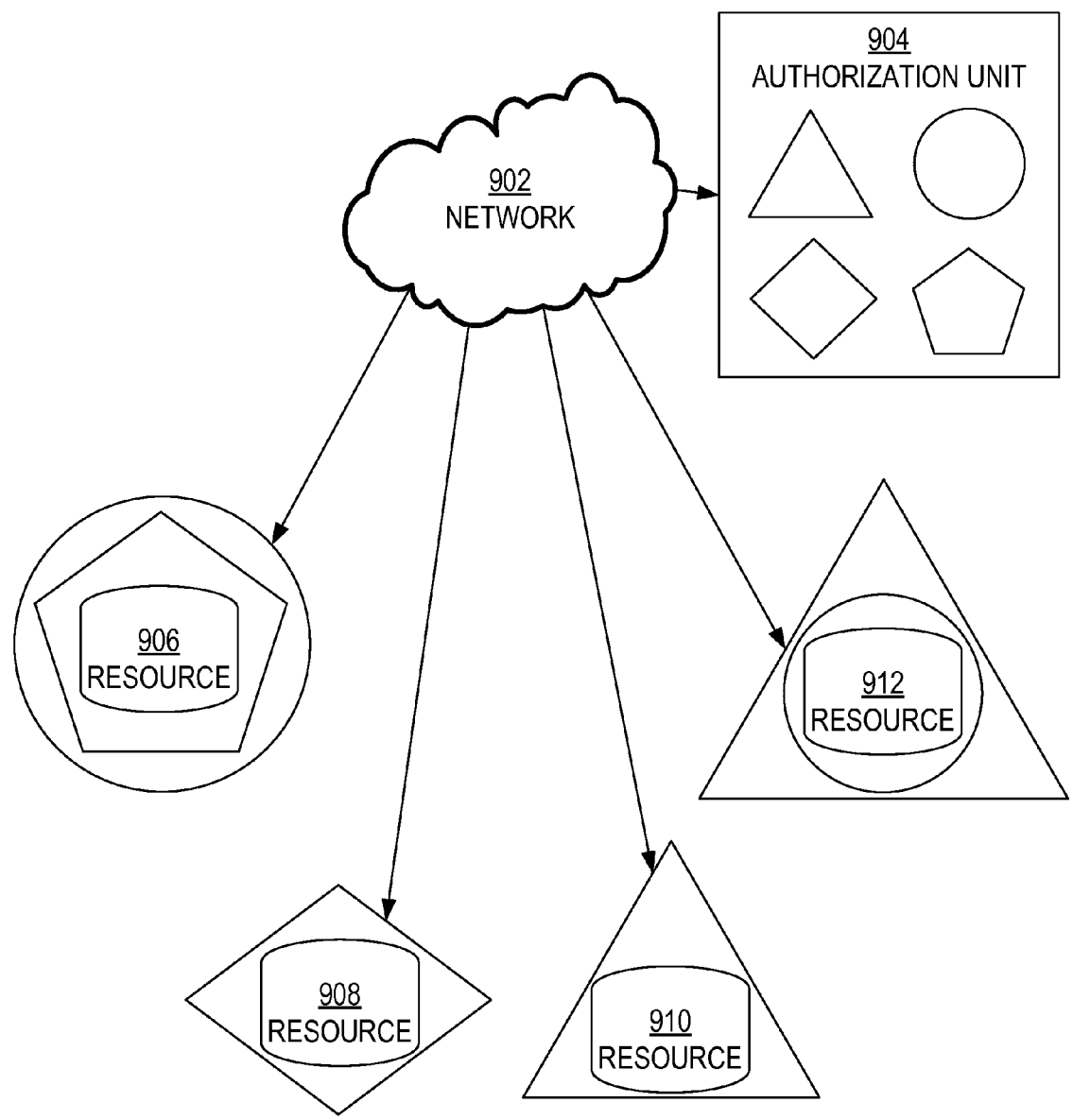
FIG. 9 is a block diagram that illustrates an example of a various real-world resources that can be protected by various authorization systems, according to an embodiment of the invention.

FIG. 9 is a block diagram that illustrates an example of a various real-world resources that can be protected by various authorization systems, according to an embodiment of the invention. An enterprise 900 can include protected resources 906-912. Enterprise 900 can include a network 902 through which users can request access to resources 906-912. Enterprise 900 can include an authorization unit 904 that stores multiple different authorization policies (represented in FIG. 9 as different geometric shapes). As shown in FIG. 9, different ones of resources 906-912 can be protected by different authorization policies, of combinations of authorization policies, maintained by authorization unit 904. Authorization unit 904 can provide central and unified management of user requests with respect to all data resources in enterprise 900, such as resources 906-912. Such user requests can include, for examples, read, write, copy, delete, or other data retrieval or manipulation requests. In response to a user request to access any of resources 906-912, authorization unit 904 can receive this request and determine which of potentially several authorization policies stored by authorization unit 904 applies to the resource. In the example shown in FIG. 9, multiple authorization policies are applicable to resources 906 and 912. Regardless of whether a single or multiple authorization policies apply to a requested resource, authorization unit 904 can select, from its unified enterprise-wide policy store, all authorization policies that apply to that resource. Authorization unit 904 can then determine, based on the selected policy or policies that apply to the resource, whether the user is authorized to perform the request-specified action(s) on the request-specified resource. Authorization unit 904 can permit or deny the user's request based on this determination.

FIG. 1 is a block diagram that illustrates an example of a common authorization framework 100, according to an embodiment of the invention. Alternative embodiments of the invention can include additional, fewer, or different components than those shown in FIG. 1. Common authorization framework 100 can include administration tools such as X2 (Oracle Identity Manager) administration tool 102, FGA (Fine-Grained Authorization) administration tool 104, and JPS administration tool 106. Each of administration tools 102, 104, and 106 can interface to the same policy API 122. Policy API 122 is an example of the unified policy API discussed above. FGA can be considered to be a certain kind of OAM authorization environment.

Framework 100 also can include an identity (ID) administration module 108. In one embodiment, ID administration module 108 can be used to create and manage identities throughout the enterprise system. Such identities may be user identities, for example. ID administration module 108 can interface with identity (ID) store 112. ID store 112 can act as a repository for the identities created using ID administration module 108. ID store 112 also can interface with policy API 122.

Framework 100 also can include a role store 124. In an embodiment, role store 124 can act as a repository for roles that have been created within the enterprise system. Identities can be assigned to roles, and roles can be assigned to permissions. In this manner, multiple users who ought to have the same kinds of permissions can be assigned to the same role, which in turn can be assigned to have those permissions. For example, a "manager" role might be associated with a specified set of permissions, and the identities of all users who ought to have those permissions can be associated with the "manager" role. Associations between identities, roles, and permissions can be maintained within role store 124. Role store 124 also can interface with policy API 122.

Framework 100 also can include policy enforcement points (PEPs) for various different kinds of security environments. For example, framework 100 can include FGA PEPs 110 and XACML PEPs 120. Each of these sets of PEPs can interface with an access entitlement server 126. Access entitlement server 126 can include multiple types of interfaces for the multiple different types of PEPs. Access entitlement server 126 can include a decision engine 128. Decision engine 128 is an example of the unified policy decision engine discussed above. Through access entitlement server 126, FGA PEPs 110 and XACML PEPs 120 can access decision engine 128 in order to determine whether specified access requests satisfy specified policies. Decision engine 128 can make such a determination and return the result of the determination back to FGA PEPs 110 and XACML PEPs 120. FGA PEPs 110 and XACML PEPs 120 can then enforce the determination made by decision engine 128 by either granting or denying access to the requested resource. In an embodiment, decision engine 128 can be capable of evaluating policies that are specified in the canonical policy format discussed above. As a result, decision engine 128 can be capable of evaluating policies that include features from different types of authorization environments (e.g., JPS, OAM, etc.), and even policies that include features from a combination of multiple different types of authorization environments. In an embodiment, access entitlement server 126 also can interface with ID store 112 in order to obtain identity information, which can be useful in making determinations as to whether a user having a specified identity ought to be granted access to a specified resource.

Framework 100 also can include JPS application clients 112. JPS application clients 112 can be implemented using the JAVA programming language, for example. JPS application clients 112 can use JPS as an authorization environment. This can be different from the kind of authorization environment that is used by FGA PEPs 110 and XACML PEPs 120. Thus, the authorization environments used within framework 100 can be heterogeneous in nature. JPS application clients can interface with an extended version of JAVA Authentication and Authorization Service (JAAS), shown in framework 100 as JAAS-extended module 114. JAAS-extended module 114 can include an FGA provider 116 and a decision engine 118. Like decision engine 128, decision engine 118 is an example of the unified policy decision engine discussed above. Indeed, in an embodiment, decision engine 118 and decision engine 128 can be separate instances of the same decision engine (i.e., having the same code base). FGA provider 116 can interface with access entitlement server 126 in a manner similar to that with which FGA PEPs 110 interface with access entitlement server 126. In an embodiment, JAAS-extended module 114 also can interface with ID store 112.

According to an embodiment, JAAS-extended module 114 can define a base permission class for full fine-grained decisions, with optional input subject, resource, action, and environment attributes; and an output result that includes an access decision (e.g., permit, deny, indeterminate, not applicable); status information; and optional named obligations. JAAS-extended can be an extended version of standard JAAS, which provides login support for user authentication methods and extends the JAVA permission mechanism to include authorization by authenticated user identities.

Framework 100 also can include an enterprise role manager 130. In an embodiment, enterprise role manager 130 includes a user interface through which an enterprise administrator can create and manage roles for use within the enterprise system. Such roles can be stored within role store 124, which can act as a repository for all roles defined within the enterprise system. Significantly, in an embodiment, the roles defined using enterprise role manager 130 can be referenced within policies that are used by any of the components discussed above, regardless of the specific kind of authorization environment those components are designed to operate with.

Framework 100 also can include a policy store 132. Policy store 132 is an example of the unified policy store that is discussed above. Policy store 132 can be accessed via policy API 122 so that administrators can create and manage policies using administration tools 102, 104 and 106. Policy store 132 also can be accessed by decision engines 118 and 128 so that decision engines 118 and 128 can determine whether the policies stored therein are satisfied by access requests coming through FGA PEPs 110, XACML PEPs 120, and JPS application clients 112. Notably, the policies stored within policy store 132 can be stored in a canonical format that complies with a unified policy schema. This unified policy schema can be designed to accommodate policy features handled by a variety of different authorization environments and their underlying access control models. For example, in an embodiment, policy store 132 can store policies that have features found in both the MAC model and the DAC model. Also for example, in an embodiment, policy store 132 can store policies that have features found in both the ABAC model and the RBAC model. Inasmuch as the policies stored within policy store 132 can specify features used in diverse kinds of authorization environments, certain embodiments of the invention can allow PEPs and applications designed for use within diverse authorization environments all to make use of the same framework 100.

Furthermore, inasmuch as the policies stored within policy store 132 can specify features found in various different kinds of access control models, policies stored within policy store 132 can be "hybrid" in nature, such that a single policy can specify features found in multiple different access control models. For example, a single policy conforming to the canonical policy format can specify features found in each of the MAC, DAC, ABAC, and RBAC models. A single policy can include both role-based features and also delegation-capable features. A single policy can include features that are found in the JPS authorization environment (but not necessarily in the OAM authorization environment) as well as features that are found in the OAM authorization environment (but not necessarily in the JPS authorization environment).

Figure 2:
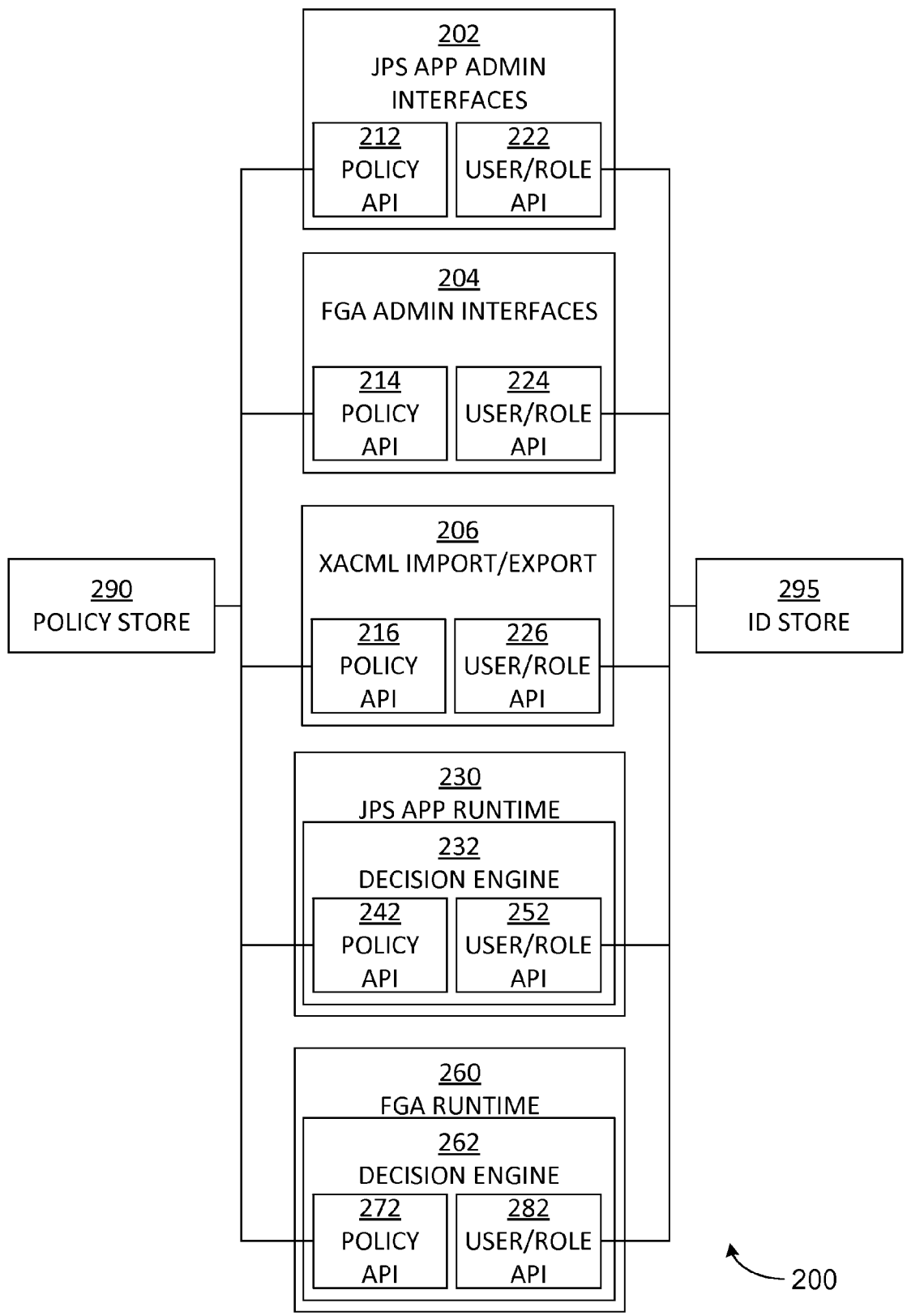
FIG. 2 is a block diagram that illustrates an example of a common policy management framework, according to an embodiment of the invention.

FIG. 2 is a block diagram that illustrates an example of a common policy management framework 200, according to an embodiment of the invention. Alternative embodiments of the invention can include additional, fewer, or different components than those shown in FIG. 2. Framework 200 can include a policy store 290 and an ID store 295. Policy store 290 can be functionally equivalent to policy store 132 of FIG. 1. ID store 295 can be functionally equivalent to ID store 112 of FIG. 1. Components conforming to various different types of authorization environments can all interface with and access policy store 290 and ID store 295. For example, such components can include JPS application administration interfaces 202, FGA administration interfaces 204, XACML import/export module 206, JPS application runtime 230, and FGA runtime 260. JPS application administration interfaces 202 can be functionally equivalent to JPS administration tool 106 of FIG. 1. FGA administration interfaces 204 can be functionally equivalent to FGA administration tool 104 of FIG. 1. FGA runtime 260 can include FGA PEPs 110 of FIG. 1. JPS application runtime 230 can be functionally equivalent to one or more of JPS application clients 112 of FIG. 1. Each of components 202, 204, 206, 230, and 260 can conform to a different authorization environment with associated differing access control models. For example, FGA runtime 260 can conform to an OAM-type authorization environment having features that are provided by the access control models found within OAM-type authorization environments, while JPS application runtime 230 can conform to a JPS-type authorization environment having features that are provided by the access control models found within JPS-type authorization environments. According to an embodiment, even though these components may adhere and conform to heterogeneous authorization environments, framework 200 permits all of these components to utilize the same policy store 290 and ID store 295.

In an embodiment, this ability to use the same policy store 290 and ID store 295 can arise at least in part due to each component's implementation of in-common APIs that can be used to interface with stores 290 and 295. More specifically, each component can implement a policy API to enable that component to interface with policy store 290, and each component can implement a user/role API to enable that component to interface with ID store 295. As shown in FIG. 2, JPS application administration interfaces 202 can include policy API 212; FGA administration interfaces 204 can include policy API 214; XACML import/export module 206 can include policy API 216; JPS application runtime can include an instance of decision engine 232, which can include policy API 242; and FGA runtime 260 can include an instance of decision engine 262, which can include policy API 272. Each of policy APIs 212, 214, 216, 242, and 262 can be a separate implementation of the same policy interface, having the same method signatures, formal parameters, and return types. Furthermore, as shown in FIG. 2, JPS application administration interfaces 202 can include user/role API 222; FGA administration interfaces 204 can include user/role API 224; XACML import/export module 206 can include user/role API 226; JPS application runtime can include an instance of decision engine 232, which can include user/role API 252; and FGA runtime 260 can include an instance of decision engine 262, which can include user/role API 282. Each of user/role APIs 222, 224, 226, 252, and 282 can be a separate implementation of the same user/role interface, having the same method signatures, formal parameters, and return types.

Figure 3:
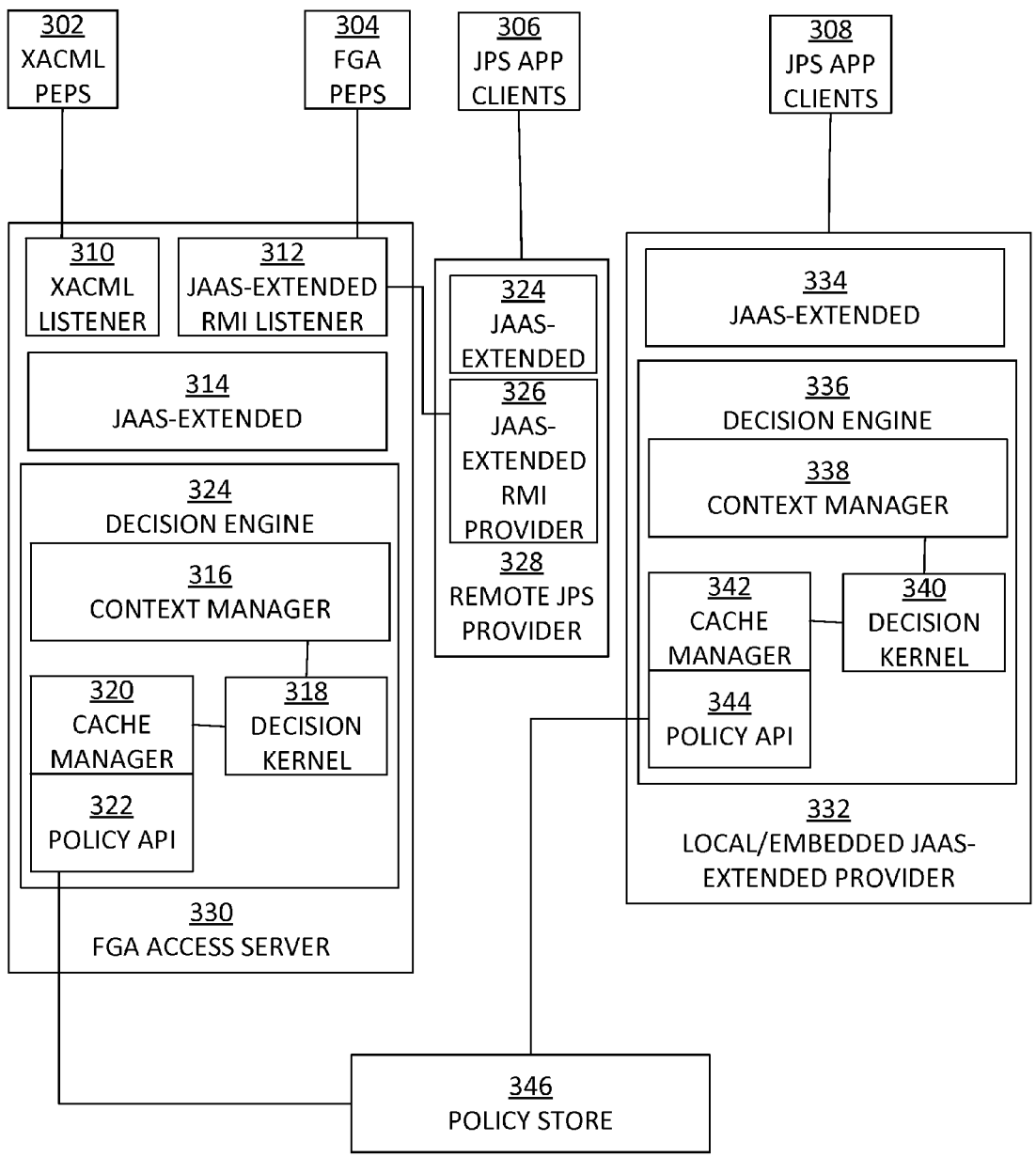
FIG. 3 is a block diagram that illustrates an example of a common decision engine and runtime framework, according to an embodiment of the invention.

FIG. 3 is a block diagram that illustrates an example of a common decision engine and runtime framework 300, according to an embodiment of the invention. Alternative embodiments of the invention can include additional, fewer, or different components than those shown in FIG. 3. Framework 300 can include XACML PEPs 302, FGA PEPs 304, JPS application clients 306, JPS application clients 308, an FGA access server 330, a remote JPS provider 328, local/embedded JAAS-extended provider 332, and a policy store 346. Policy store 346 can be functionally equivalent to policy store 132 of FIG. 1. FGA access server 330 can include an XACML listener 310, a JAAS-extended remote method invocation (RMI) listener 312, a JAAS-extended module 314, and a decision engine 324. Decision engine 324 can be functionally equivalent to decision engine 128 of FIG. 1. Remote JPS provider 328 can include a JAAS-extended module 324 and a JAAS-extended remote method invocation (RMI) provider 326. JAAS-extended RMI provider 328 can interface with JAAS-extended RMI listener 312. Local/embedded JAAS-extended provider 332 can include a JAAS-extended module 334 and a decision engine 336. Decision engine 336 can be functionally equivalent to decision engine 128 of FIG. 1.

Decision engines 324 and 336 each can include a context manager: context managers 316 and 338. Decision engines 324 and 336 each can include a decision kernel that interfaces with that decision engine's context manager: decision kernels 318 and 340. Decision engines 324 and 336 each can include a cache manager that interfaces with that decision engine's decision kernel: cache managers 320 and 342. Decision engines 324 and 336 each can include a policy API that interfaces with that decision engine's cache manager: policy APIs 322 and 344. Policy APIs 332 and 344 can be functionally equivalent to policy API 122 of FIG. 1. Policy APIs 332 and 344 each can interface with policy store 346.

XACML PEPs can interface with XACML listener 310. FGA PEPs 304 can interface with JAAS-extended RMI listener 312. JPS application clients 306 can interface with JAAS-extended module 324. JPS application clients 308 can interface with JAAS-extended module 334. Thus, even though components 302, 304, 306, and 308 can conform to different authorization environments having features of different access control models, each of components 302, 304, 306, and 308 can perform authorization functions based on canonically formatted policies stored in policy store 346. Decision engines 324 and 336 can be separate instances of a same unified policy decision engine that is capable of evaluating such canonically formatted policies.

Figure 4:
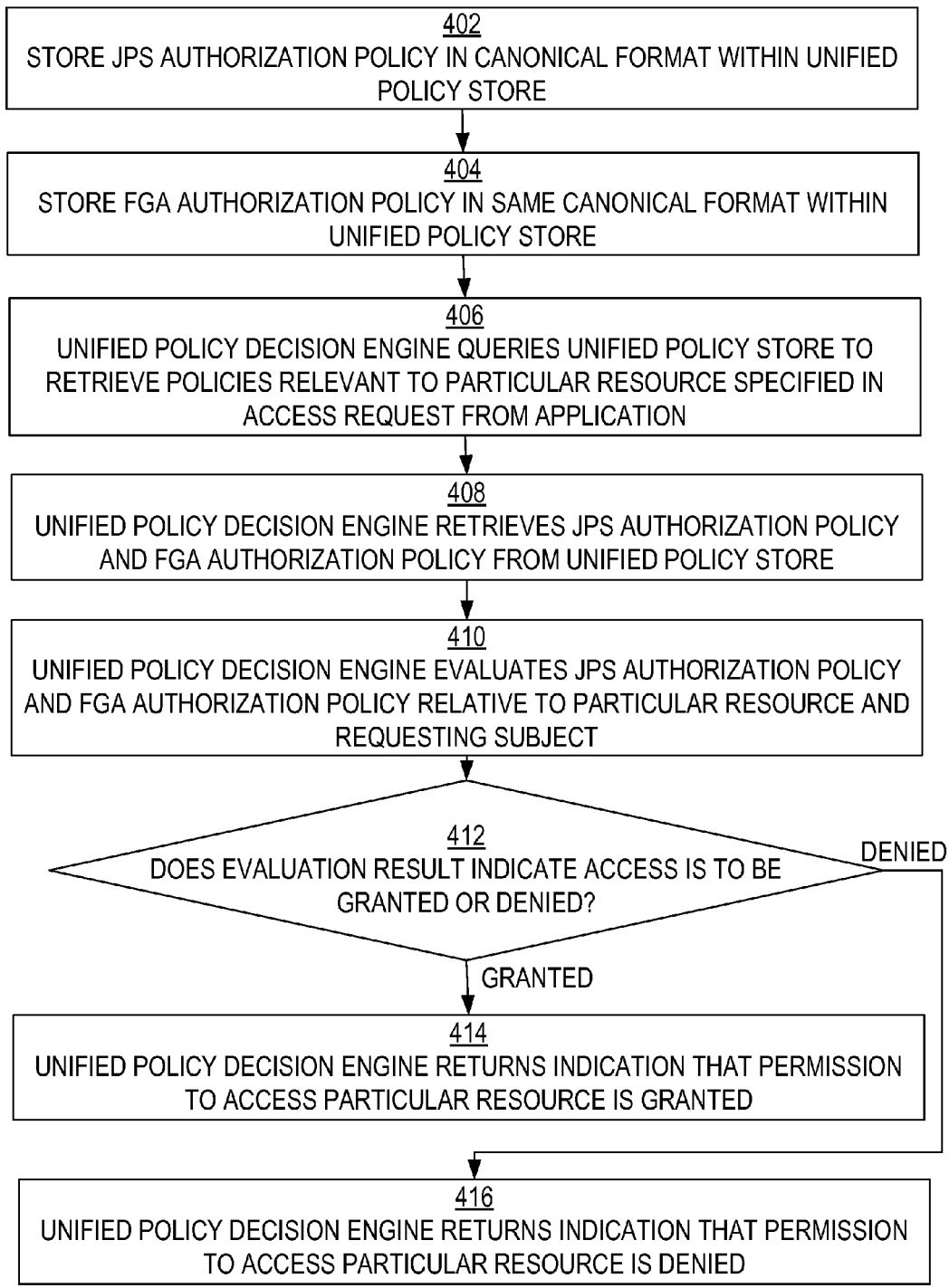
FIG. 4 is a flow diagram that illustrates an example of a technique for evaluating canonically formatted policies using a unified policy decision engine to determine whether to grant access to a resource, according to an embodiment of the invention.

FIG. 4 is a flow diagram that illustrates an example of a technique 400 for evaluating canonically formatted policies using a unified policy decision engine to determine whether to grant access to a resource, according to an embodiment of the invention. Alternative embodiments of the invention can include additional, fewer, or different operations than those shown in FIG. 4. In block 402, a JPS authorization policy is stored within a unified policy store in a canonical format that conforms to a unified schema. In block 404, an FGA (or OAM) policy is stored within the unified policy store in the same canonical format that conforms to the same unified schema. In block 406, in response to a request, from an application executing in an enterprise environment, to access a particular resource, a unified policy decision engine queries the unified policy store in order to retrieve policies that are relevant to the particular resource. In a particular case, both the JPS authorization policy and the FGA (or OAM) policy might be relevant to the particular resource. In block 408, the unified policy decision engine retrieves both the JPS authorization policy and the FGA (or OAM) policy from the unified policy store. In block 410, the unified policy decision engine evaluates both the JPS authorization policy and the FGA (or OAM) policy relative to the particular resource and the requesting subject. The evaluation can involve determining a role that the requesting subject possesses, and determining the permissions that are associated with that role. Where multiple policies are relevant to a particular resource, the evaluation can involve performing a union of the relevant policies. In block 412, the unified policy decision engine determines, based on the result of the evaluation, whether to grant the requesting subject access to the particular resource. If the result indicates that access is to be granted, then control passes to block 414. Otherwise, if the result indicates that access is to be denied, then control passes to block 416.

In block 414, the unified policy decision engine returns, to the requesting subject, an indication that permission to access the particular resource is granted. Alternatively, in block 416, the unified policy engine returns, to the requesting subject, an indication that permission to access the particular resource is denied.

According to an embodiment of the invention, the unified policy store contains information entities that canonically represent features of multiple different access control models. For example, the canonical format can contain fields for rules, policies, and policy sets that are features of the XACML model. The canonical format additionally can contain fields for attribute constraints that are features of the ABAC model and XACMLS. The canonical format additionally can contain fields for roles and role hierarchies that are features of the RBAC model. The canonical format additionally can contain fields for permissions that are features of the JAVA 2 model. The canonical format can include declarative policy and collective attribute constructs for inheritance along hierarchically organized resource name spaces.

In an embodiment of the invention, the canonical format is designed to be extensible in order to accommodate evolving standards and proprietary extensions. For example, in an embodiment, the canonical format is extensible to permit policies to specify resource types and role categories. In such an embodiment, the unified policy decision engine can make a determination as to whether access to a particular resource is granted or denied based at least in part on a type of the particular resource (e.g., file, directory, memory segment, port, application program, etc.). In such an embodiment, the unified policy decision engine can make a determination as to whether access to a particular resource is granted or denied based at least in part on a role category to which a specified role (e.g., of the requesting subject) belongs; roles can be grouped together into various different role categories, and even into hierarchies of role categories in which one role category can be a parent or child of another role category within a hierarchy.

As is discussed above, in an embodiment, policies stored in the unified policy store are formatted in a canonical format that conforms to a unified policy schema. In an embodiment, under this unified schema, each policy can take the form of a list of grants. Each such grant can specify both a grantee and a list of permissions. A grantee can include a list of principals, a code source, and signers. Each principal can be specified as a class and a name. Each code source can be specified as a uniform resource locator (URL). Each permission in the list of permissions can specify a permission class, a target name, permission actions, and signers.

In an embodiment, a principal can be a user, a group, an application role, a code source, or a dynamic query. In an embodiment, a resource can have a resource type and a locality. In an embodiment, a policy can specify an effect (e.g., allow or deny), a principal, a resource, an action, an environment, an application role, and a list of permissions.

In an embodiment of the invention, a policy administration and delegation model can be followed within the framework discussed above. According to this model, a separate application domain can be established for each separate application within the enterprise system. Each such application domain can be established by a designated application domain administrator for a particular application at the time that the particular application is deployed into the enterprise system. Each application domain can have associated application-specific policies as well as metadata pertaining to those policies. In an embodiment, all policies for all application domains, and all metadata for those policies, are stored within a single unified policy store for the entire enterprise system. Although each application domain can have a separate application domain administrator, in an embodiment, multiple application domain administrators can be designated for a particular application domain. In an embodiment, an application domain administrator can create new policies for his application domain and can modify policies for his application domain. Potentially, the policies created by two separate application domain administrators for two separate application domains can be stored within the same unified policy store and can be queried, retrieved, and evaluated by the same unified policy decision engine. In an embodiment, an application domain administrator can associate access permissions within his application domain to roles that exist within the enterprise system. In one embodiment, the application domain administrator cannot create new enterprise-wide roles, but can assign permissions to existing enterprise-wide roles for the application to which his application domain pertains. In one embodiment, an application domain administrator can delegate, to other users who are associated with his application domain, a subset of creation or modification or delegation permissions that the application domain administrator himself possesses. In one embodiment, a single application domain can pertain to a group of multiple applications rather than a single application. An application domain can pertain to resources other than applications, such as files, directories, ports, memory segments, etc.

Obligation System Using Standard
Permission-Based Authorization System

In an embodiment of the invention, an extension can be introduced into the framework described above. This extension can be used to provide new and interesting features to an enterprise's access control system. In one embodiment of the invention, the framework described above can use the JAVA security model. In the JAVA security model, in order to make a request, an application can pass, to the provider of a specified resource, data called a "permission." The permission can indicate operations that an access control system has determined that the application is allowed to perform. The request including the permission can ask the resource provider to determine whether the application is authorized to perform a specified operation (e.g., read, write, modify, delete, create, etc.) relative to the specified resource. In response to the request, the resource provider can process the passed permission as a part of determining whether the application is authorized to perform the specified operation. Having made this determination, the resource provider can indicate, to the application, either that the application is permitted to perform the specified operation relative to the specified resource or that the application is not permitted to perform the specified operation relative to the specified resource. The application's receipt of a denial indication can cause the application to throw an exception.

A multitude of existing applications already use the JAVA security model to perform access control functions. These applications often use permissions, discussed above, as a conduit to ask the question of whether those applications are permitted to perform operations relative to resources. Because so many existing applications already use the JAVA security model, it can be beneficial for an enhanced access control system to continue using the JAVA security model if possible, so that the existing applications do not need to be modified to a great extent, if at all, in order to gain the benefit of the enhancement. Such an enhancement can involve the use of additional information, from and concerning the enterprise environment in which the application executes, in making the determination of whether an application is authorized to perform a specified operation relative to a specified resource in that environment. For example, such additional information from and concerning the environment can include the current time recognized throughout the environment (not necessarily specific or unique to any single application executing within that environment). Such additional information can include information that an authorization system can make available to the resource provider at the time that the resource provider determines whether a requesting application is or is not permitted to perform a specified operation relative to a specified resource.

In an embodiment of the invention, techniques disclosed herein can be used to gather such additional information. Additionally or alternatively, in an embodiment of the invention, such additional information can be supplied with the application's request. Such additional information can be passed in to the resource provider. In one embodiment of the invention, when the resource provider returns a reply to the application's request, the resource provider can supply, within or along with the reply, additional information about the request. Such additional information that the resource provider can return in the response to the application's request can be in the form of an "obligation." As is discussed above, when an authorization request is made, the reply to that request can indicate a positive or negative result, specifying whether access to the specified resource is allowed. In addition to that result, the reply can indicate that the requesting application needs to fulfill some specified set of requirements or perform some specified set of actions. An "obligation" is such a set of requirements that the requesting application needs to fulfill or such as set of actions that the requesting application needs to perform. For example, a user might supply log-in information such as a username and password to a bank's web site. As part of the authentication process, the bank's web site might send back, to the user's mobile device, a Short Messaging Service (SMS) text message that asks the user to supply some additional item of information. Under such circumstances, the obligation can be the requirement that the bank's web site obtain such an additional item of information from the user. The bank's web site fulfills the obligation by sending the SMS text message and validating the reply to that SMS text message. The obligation can be used to enhance security, by making the resource requestor satisfy a heightened challenge by responding to the SMS text message. Although the satisfaction of an obligation can involve user interaction, in an embodiment, not all obligations necessarily involve user interaction to be satisfied. For example, an obligation might require a requesting application to log, in a computer-readable storage memory, the fact that a particular transaction occurred.

As a result of enabling additional information to be passed to the resource provider in the application's request, and as a result of enabling additional information to be returned to the application in the resource provider's response, a better authorization experience may be obtained for users of the enterprise authorization system. In an embodiment of the invention, the JAVA security model can be enhanced to enable such additional information to be communicated between applications and resource providers, so that those components can continue to use the same security model that they had been using prior to the enhancement.

In an embodiment, the permission discussed above can be passed from the application to the resource provider within a payload section of a request formatted according to the JAVA security model. A mechanism to pass additional information to the resource provider—in addition to the information already contained within the permission—is discussed herein. A mechanism to return additional information (i.e., obligations) to the requesting application is also discussed herein. In an embodiment, an enterprise authorization engine can return obligations and/or other information while concurrently implementing a delegated administration model. Such a delegated administration model can, for example, permit a user who has been assigned certain administrative privileges (e.g., relative to specified resources) to delegate a subset of those administrative privileges to other users in the same enterprise system.

According to an embodiment of the invention, the JAVA security model's permissions are extended with constructs such as obligations. An additional payload, containing obligations, can be transmitted back and forth between requesting applications and resource providers. In one embodiment, these constructs can be used to perform decisions regarding whether requesting applications are permitted to perform specified operations relative to specified resources. In one embodiment, these constructs can be used by applications to perform certain actions. The extensibility of the JAVA security model can be used to implement certain features.

In an embodiment, the payload that a resource provider returns to a requesting application can be controlled by policies that are managed outside of the permission aspect of the JAVA security model. The obligation payload that the resource provider returns to the requesting application can contain information that is based on the policy that the resource provider (potentially in conjunction with a unified policy decision engine) evaluated. For example, a policy may state that whenever a user accesses a particular resource through a requesting application, an obligation is to be returned to the requesting application requiring that application to report the particular resource's access to that user's supervisor. Enhancements discussed herein can go beyond merely adding static information to requests and returning added static information in responses, because the kind of information that is added (e.g., as an obligation) to those responses can be policy-driven. In the above example of a bank web site sending an SMS text message to a user's mobile device as an obligation as part of a log-in process, the decision to send the SMS text message can be policy-driven. In the foregoing scenario, the decision to send the SMS text message can be dynamic, and performed as a result of an evaluation of an applicable policy in the context of existing environmental conditions, rather than static or always occurring.

In an embodiment of the invention, a system that implements a user interface (e.g., the bank web site's user interface in the example above) can be extended to send an obligation. For example, the bank's web site can send an SMS text message to a user's mobile device and then wait until the user provides a response to the SMS challenge through the user interface of the bank's web site. However, the logic executing on the bank's web site can also allow some older legacy applications to ignore an obligation if those applications are not configured to recognize such obligations. Under such circumstances, the legacy application can still gain access to the protected resource through the more standard use of permissions, which the legacy application can recognize even if the legacy application is not configured to recognize obligations. In both the case of an application that can recognize obligations, and the case of a legacy application that cannot recognize obligations, the structure of the permission used to perform the authorization process can remain constant. A policy can specify that, depending on whether an application recognizes obligations or not, an obligation either will or will not be sent to that application in response to that application's request to access a resource. Non-legacy applications that are capable of recognizing obligations can be required to fulfill obligations, as specified within policies.

In an embodiment, the permission that a requesting application sends to a resource provider as part of a request to access a resource further indicates, to the policy decision engine, whether the requesting application is capable of understanding obligations. As is discussed above, in an embodiment, the format and structure of the permission remains constant regardless of whether the requesting application actually is capable of understanding obligations.

An obligation to perform some specified action can be placed upon the requesting application even if the requesting application has already gained access to the protected resource as a consequence of the application's permission indicating that the requesting application should be given such access. Thus, the application's satisfaction of the obligation, at least in one embodiment, is not strictly a precondition to granting the requesting application access to the protected resource, though the application may nevertheless be expected to satisfy the obligation if the application is capable of doing so even after access to the protected resource has been granted. In an embodiment, an obligation describes a requirement that an application needs to fulfill, or an action that the application needs to perform, in conjunction with and additional to that application either receiving or being denied access to a protected resource. An obligation can indicate what the requesting application needs to do in conjunction with that application receiving access to a protected resource, or an obligation can indicate what the requesting application needs to do in conjunction with that application being denied access to a protected resource.

The JAVA security model is a legacy security model that has not previously utilized the concept of obligations. Certain embodiments of the invention provide mechanisms through which the JAVA security model can, nevertheless, utilize obligations. In an embodiment, existing JAVA security model structures can be used for passing environmental information and for retrieving obligation information. Such environmental information can include, for example, an identity of and/or type of a device on which the resource-requesting application is executing, or any other information that a policy could use in determining whether to grant or deny access to a resource. Embodiments of the invention can provide conduits, within the legacy JAVA security model, whereby information can be passed to and received from the authorization system. Embodiments of the invention can provide such conduits in a JAVA 2 permission-based policy model.

As is discussed above, an authorization system can involve policies; such policies can be stored within a unified policy store in a canonical format. An application that requests access to a protected resource essentially asks the authorization system to determine, based at least in part on such policies, whether that application ought to be granted access to that protected resource. It is not necessarily relevant, to the authorization system, what purpose the application has in requesting the access. The authorization system can perform its policy-driven operations after an authentication process has been independently completed; the authorization system can, under at least some circumstances, rely upon the already-authenticated identity of the resource requestor in evaluating a policy as part of the authorization process. However, in an embodiment, policies can also be applied to the authentication process. For example, a policy can indicate that whenever an Internet Protocol (IP) address associated with an authenticating entity differs from an IP address that is normally associated with that authenticating entity, then an additional challenge should be presented to the authenticating entity as a part of the authentication process. The requirement that an application present this additional challenge can be structured as an obligation.

According to an embodiment, an obligation can be an element of a policy. In creating a new policy, the author of that policy can enter one or more obligations that are elements of that policy.

As is discussed above, in an embodiment of the invention, conduits can be provided whereby information can be passed to and received from an authorization system in a JAVA 2 permission-based policy model. In one such embodiment, such information can be passed to and received from the authorization system within a payload section of a permission that is already used in the authorization system in the existing legacy JAVA security model. For example, in one embodiment, an obligation can be included within a payload section of a permission. In an embodiment of the invention, a policy decision engine can be specifically adapted in order to handle a permission payload containing such information. Thus, the implementation of the authorization system can be adapted to remain compatible with a JAVA 2 permission-based policy model and standard, but also can be extended to recognize and process additional information such as obligations.

If a permission containing such additional information (e.g., an obligation) within its payload is received by an implementation of an authorization system that does not recognize such additional information, then the fact that permission contains such additional information in its payload will not cause that implementation to malfunction; instead, such an implementation can respond as usual to the permission with a positive or negative reply indicating that access to a specified resource is granted or denied. However, implementations that are capable of recognizing such additional information can provide enhanced functionality (e.g., by specifying requirements that the requesting application needs to perform in the form of obligations). Beneficially, by adapting an existing authorization implementation, the permission aspect of such an implementation does not necessarily need to be re-implemented; such an aspect can be re-used in the enhanced implementation.

In one embodiment of the invention, the permission discussed above can be implemented in an object-oriented system as a Permission class. The Permission class can expose a method to supply additional information from the application to the authorization system. This Permission class can expose methods such as getName( ) and getActions( ) that can be invoked by applications. The Permission class also can include a constructor method that is invoked whenever a new instance of the Permission class is instantiated by an application. A file permission, such as java.io.FilePermission, is an example of one kind of permission that might exist in an authorization system. The file permission can pertain to a specified resource (e.g., a file) within an enterprise.

A particular application within the enterprise might attempt to perform a read operation relative to that specified resource, for example. In the existing legacy JAVA security model, a standard API having a method called AccessController.checkPermission( ) exists. The particular application might ask the authorization system, through this API, whether the particular application has permission to perform the read operation relative to the specified resource. If the application does not have permission to perform the operation, then the authorization system can throw an exception. Alternatively, if the application does have permission to perform the operation, then the authorization system can permit the application to open the file.

Applications can specify their own custom permissions within their executable code. Such a custom permission can indicate, for example, whether an application is permitted to proceed further if a link within a web page is clicked upon. The authorization system can receive such a permission and perform a permission check. The authorization system can delegate, to the resource provider itself, the question of whether the application is permitted to perform the specified operation relative to the resource that the resource provider provides. Under such circumstances, the resource provider itself can answer the question.

In an embodiment of the invention, a new kind of permission, called a holder-permission, can be defined. Such holder-permissions can be implemented as a set of classes that each extend an existing permission class. There can be many different kinds of holder-permissions, but all of them can be based in certain concepts. Holder-permissions can be used to enhance an authorization system to perform more sophisticated kinds of access control. For example, using a holder-permission, an authorization system can prevent a particular resource (e.g., a file) from being accessed during a specified time interval (e.g., any weekend).

The AccessController.checkPermission( ) method discussed above may only accept an instance of the permission class as input. Because a holder-permission class (of which there can be many different kinds) can derive from and extend (e.g., via inheritance) the more basic permission class, this standard API can also accept instances of a holder-permission class. In the payload of a holder-permission object (an instance of some holder-permission class), additional information can be passed to the authorization system. For example, a current enterprise-wide time can be passed within the payload of a holder-permission, so that a determination can be made as to whether an application is attempting to access the resource during a specified time interval (e.g., on a weekend). As a part of passing the holder-permission object to the authorization system, the AccessController.checkPermission( ) method of the standard API of the authorization system can be invoked. In an embodiment, the resource provider can recognize that the holder-permission object is a holder-permission rather than a basic permission, and can further recognize capabilities of that holder-permission. The resource provider can use the additional information that is specified within the holder-permission object's payload in order to perform enhanced access control functionality. The object that the authorization system returns to the requesting application can expose a getObligations( ) method that the requesting application can invoke in order to discover any obligations that the object specifies.

An enhanced application can continue to use the existing standard underlying permission-based resource authorization model throughout this process, but the enhanced application can add information (e.g., current time or accessing resource via Intranet or Extranet) to the holder-permission that the enhanced application sends to the authorization system as part of an access request, and the enhanced application can gather obligations from the object returned by the authorization system. Other applications that are not designed to recognize the user-permission class can continue to use the permission-based authorization system without changing anything internally. Thus, legacy applications can continue to interface with the authorization system through the same standard APIs.

As is discussed above, an authorization system can delegate, to the resource provider for a resource, an application's request to access that resource. The resource provider can receive the permission passed in the request and locate, in a policy store, policies that pertain to the resource that the permission specifies. The resource provider can use a policy decision engine to determine whether those policies are satisfied. In an embodiment, the resource provider can be enhanced in order to recognize and handle holder-permissions in addition to basic permissions. In an embodiment, in response to the resource provider receiving a holder-permission rather than a basic permission, the resource provider can locate, in the policy store, policies that pertain to the additional information (e.g., current time) that is contained within the payload of the holder-permission. The resource provider can similarly use the policy decision engine to determine whether those policies (e.g., policies that indicate times at which the resource can be accessed) are satisfied. In an embodiment, a policy can specify that an obligation is to be returned to the requesting application. Authorization policy decisions are merely one kind of policy decision that can be made using techniques discussed herein; other policy decisions, such as those pertaining to authentication, also can be made using the techniques discussed herein.

In one embodiment, logging also can be performed as a part of the authorization process discussed above. All of the information that is being generated by the resource provider during the authorization process can be stored within a holder-permission object. The returned object can then specify, to the requesting application, all of the activities that the resource provider performed during the authorization process.

As is discussed above, there can be many different kinds of holder-permissions. Each such kind of holder-permission can extend a different kind of basic permission. For example, one kind of holder-permission class can extend a basic permission class "X" while another kind of holder-permission class can extend a basic permission class "Y." Multiple instances of each kind of holder-permission class can be instantiated as separate objects. In an embodiment, each kind of holder-permission class can be implemented differently, and yet all kinds of holder-permission classes can expose the same specified interface.

Using the techniques discussed above, applications can pass virtually any kind of additional information to an authorization system in a resource access request. In order to evaluate requests containing such additional information, policies that specify rules whose outcome depends on such additional information can be specified and placed within the policy store that the authorization system uses. The policy engine that the authorization system uses can evaluate such policies, using the additional information to determine whether those policies are satisfied. Authors of policies can specify, in those policies, specific obligations that are to be returned to applications under circumstances in which those policies are satisfied. In an embodiment, such obligations can be passed within a payload of an object that is an instance of some holder-permission class that extends a basic permission class. In response to gathering such an obligation from an object that the application receives back from the authorization system, the application can proceed to fulfill the obligation's specified requirements.

Figure 7:
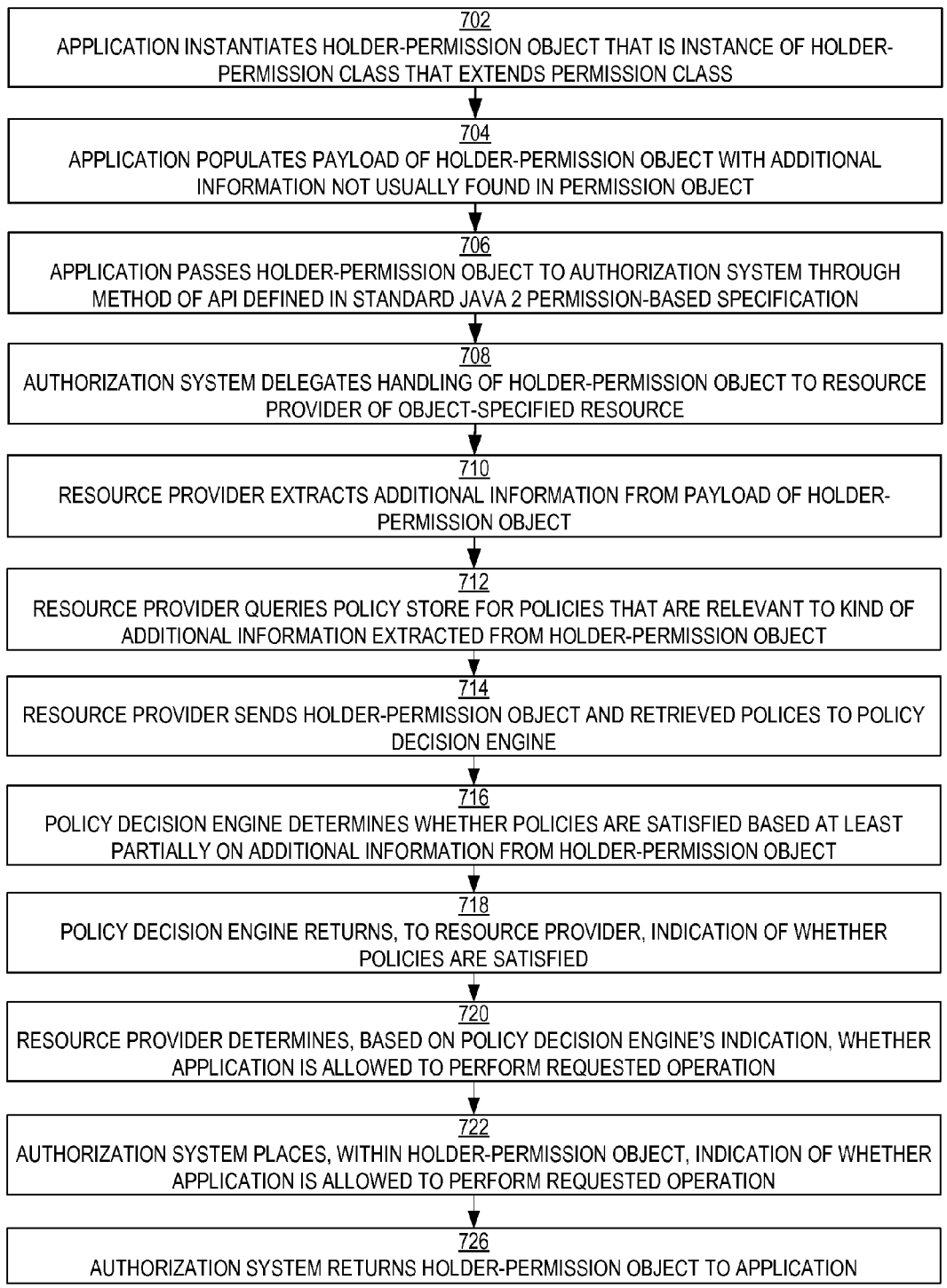
FIG. 7 is a flow diagram that illustrates an example of a technique for extending a standard JAVA 2 permission-based authorization system to perform enhanced access control based on additional information, according to an embodiment of the invention.

FIG. 7 is a flow diagram that illustrates an example of a technique 700 for extending a standard JAVA 2 permission-based authorization system to perform enhanced access control based on additional information, according to an embodiment of the invention. Alternative embodiments of the invention can include additional, fewer, or different operations than those shown in FIG. 7. In block 702, an application can instantiate a holder-permission object whose class is a holder-permission kind of class that extends a basic permission kind of class. The basic permission kind of class can be one that is already defined in the standard JAVA 2 permission-based authorization system. In block 704, the application can populate a payload of the holder-permission object with additional information (e.g., a current time within an enterprise) that is not usually found in a standard permission object. The holder-permission object can also specify a resource relative to which the application is attempting to perform an operation (e.g., a read operation). In block 706, the application can pass the holder-permission object to an authorization system through an accessController.checkPermission( ) method of a standard API defined in the standard JAVA 2 permission-based authorization system. In block 708, the authorization system can receive the holder-permission object and can delegate the handling of the holder-permission object to a resource provider that provides the resource specified by the holder-permission object. In block 710, the resource provider can extract the additional information (e.g., current time) from the payload of the holder-permission object. In block 712, the resource provider can query a policy store to retrieve all polices that are applicable to the additional information; for example, the resource provider can query the policy store for all policies that contain rules that depend on additional information of the kind (e.g., time) specified within the payload of the holder-permission object. In block 714, the resource provider can send the retrieved policies and the holder-permission object to a policy decision engine. In block 716, the policy decision engine can evaluate the policies to determine whether the policies are satisfied by (among potentially other criteria) the additional information contained in the payload of the holder-permission object. For example, the policy decision engine can determine whether the current time specified within the payload of the holder-permission object falls within a time interval specified within a particular policy that pertains to the specified resource. In block 718, the policy decision engine can return, to the resource provider, an indication of whether the policies were satisfied. In block 720, the resource provider can determine, based on the indication returned by the policy decision engine, whether the application is allowed to perform the requested operation relative to the specified resource. In block 722, the authorization system can place, within the holder-permission object, an indication of whether the application is allowed to perform the requested operation. In block 726, the authorization system can return the holder-permission object, containing the indication, to the application. The application can then perform the requested operation if the returned holder-permission object indicates that the application is allowed to do so.

Figure 8:
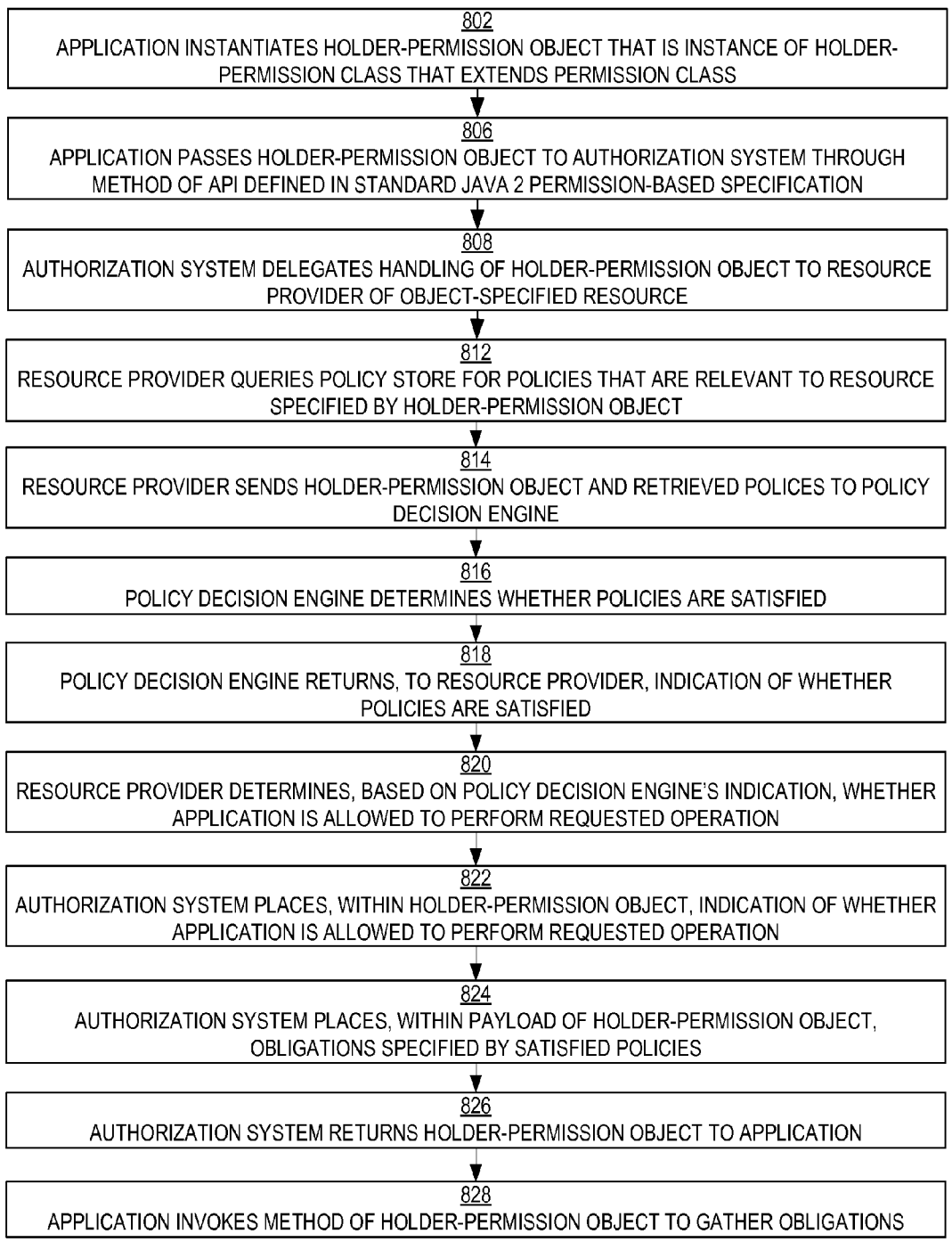
FIG. 8 is a flow diagram that illustrates an example of a technique for extending a standard JAVA 2 permission-based authorization system to return, to applications, obligations that the applications need to satisfy in conjunction with accessing a resource, according to an embodiment of the invention.

FIG. 8 is a flow diagram that illustrates an example of a technique 800 for extending a standard JAVA 2 permission-based authorization system to return, to applications, obligations that the applications need to satisfy in conjunction with accessing a resource, according to an embodiment of the invention. Alternative embodiments of the invention can include additional, fewer, or different operations than those shown in FIG. 8. In block 802, an application can instantiate a holder-permission object whose class is a holder-permission kind of class that extends a basic permission kind of class. The basic permission kind of class can be one that is already defined in the standard JAVA 2 permission-based authorization system. The holder-permission object can specify a resource relative to which the application is attempting to perform an operation (e.g., a read operation). In block 806, the application can pass the holder-permission object to an authorization system through an accessController.checkPermission( ) method of a standard API defined in the standard JAVA 2 permission-based authorization system. In block 808, the authorization system can receive the holder-permission object and can delegate the handling of the holder-permission object to a resource provider that provides the resource specified by the holder-permission object. In block 812, the resource provider can query a policy store to retrieve all polices that are applicable to the specified resource. In block 814, the resource provider can send the retrieved policies and the holder-permission object to a policy decision engine. In block 816, the policy decision engine can evaluate the policies to determine whether the policies are satisfied. One or more of the policies can specify one or more obligations that the application is required to perform in conjunction with performing the requested operation relative to the specified resource. In block 818, the policy decision engine can return, to the resource provider, an indication of whether the policies were satisfied. In block 820, the resource provider can determine, based on the indication returned by the policy decision engine, whether the application is allowed to perform the requested operation relative to the specified resource. In block 822, the authorization system can place, within the holder-permission object, an indication of whether the application is allowed to perform the requested operation. In block 824, the authorization system can place, within a payload of the holder-permission object, one or more obligations that are specified by one or more of the satisfied policies. In block 826, the authorization system can return the holder-permission object, containing the indication and the one or more obligations, to the application. In block 828, by invoking a getObligations( ) method of the returned holder-permission object, the application can gather the one or more obligations from the payload of the returned holder-permission object. The application can then perform the requested operation assuming that the returned holder-permission object indicates that the application is allowed to do so. In conjunction with performing the requested operation, the application can also perform the operations that are specified by the one or more obligations gathered from the returned holder-permission object.

Hardware Overview

Figure 5:
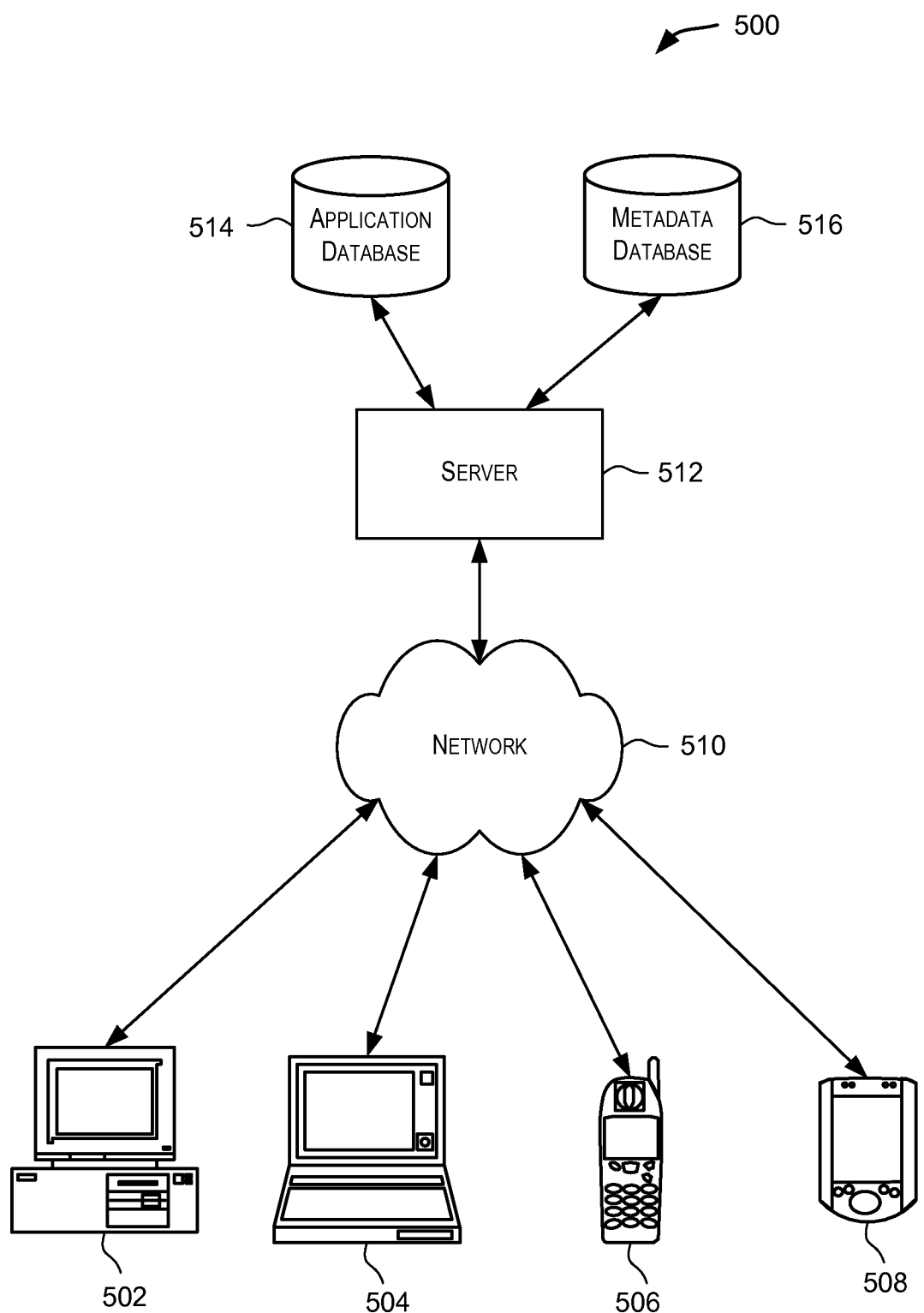
FIG. 5 is a simplified block diagram illustrating components of a system environment that may be used in accordance with an embodiment of the present invention.

FIG. 5 is a simplified block diagram illustrating components of a system environment 500 that may be used in accordance with an embodiment of the present invention. As shown, system environment 500 includes one or more client computing devices 502, 504, 506, 508, which are configured to operate client applications including native client applications and possibly other applications such as a web browser, or the like. In various embodiments, client computing devices 502, 504, 506, and 508 may interact with a server 512.

Client computing devices 502, 504, 506, 508 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 502, 504, 506, and 508 may be any other electronic device, such as a thin-client computer, Internet-enabled gaming system, and/or personal messaging device, capable of communicating over a network (e.g., network 510 described below). Although exemplary system environment 500 is shown with four client computing devices, any number of client computing devices may be supported. Other devices such as devices with sensors, etc. may interact with server 512.

System environment 500 may include a network 510. Network 510 may be any type of network familiar to those skilled in the art that can support data communications using any of a variety of commercially-available protocols, including without limitation TCP/IP, SNA, IPX, AppleTalk, and the like. Merely by way of example, network 510 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 also includes one or more server computers 512 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 512 may be adapted to run one or more services or software applications.

Server 512 may run an operating system including any of those discussed above, as well as any commercially available server operating system. Server 512 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 500 may also include one or more databases 514, 516. Databases 514, 516 may reside in a variety of locations. By way of example, one or more of databases 514, 516 may reside on a non-transitory storage medium local to (and/or resident in) server 512. Alternatively, databases 514, 516 may be remote from server 512, and in communication with server 512 via a network-based or dedicated connection. In one set of embodiments, databases 514, 516 may reside in a storage-area network (SAN) familiar to those skilled in the art. Similarly, any necessary files for performing the functions attributed to server 512 may be stored locally on server 512 and/or remotely, as appropriate. In one set of embodiments, databases 514, 516 may include relational databases, such as databases provided by Oracle, that are adapted to store, update, and retrieve data in response to SQL-formatted commands.

Figure 6:
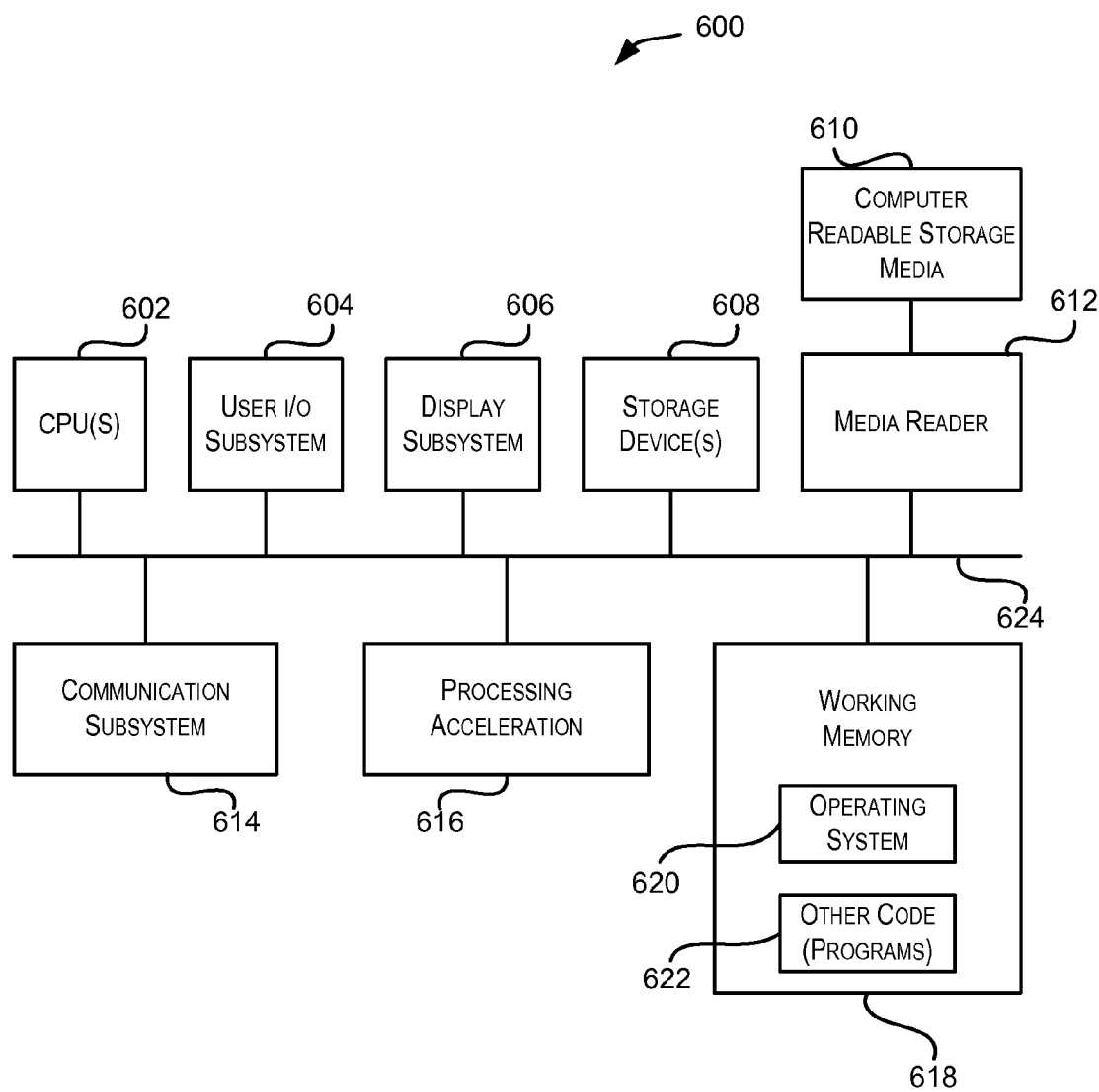
FIG. 6 is a simplified block diagram of a computer system that may be used in accordance with embodiments of the present invention.

FIG. 6 is a simplified block diagram of a computer system 600 that may be used in accordance with embodiments of the present invention. For example server 512 or clients 502, 504, 506, or 508 may be implemented using a system such as system 600. Computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608. By way of example, the storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. Communications system 614 may permit data to be exchanged with network 510 and/or any other computer described above with respect to system environment 500.

Computer system 600 may also comprise software elements, shown as being currently located within working memory 618, including an operating system 620 and/or other code 622, such as an application program (which may be a client application, Web browser, mid-tier application, RDBMS, etc.). In an exemplary embodiment, working memory 618 may include executable code and associated data structures used for authorization processing as described above. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
    storing, in a policy store that is stored within a computer-readable storage memory and utilized by a plurality of applications in an enterprise, a first authorization policy that specifies features that are used within a first type of authorization environment;
    storing, in the policy store, a second authorization policy that specifies features that are used within a second type of authorization environment that differs from the first type of authorization environment;
    determining that the first authorization policy and the second authorization policy in the policy store are relevant to a request from an application of the plurality of applications;
    performing a union of the first authorization policy, configured for use within the first type of authorization environment, and the second authorization policy, configured for use within the second type of authorization environment, wherein the second type of authorization environment is an Oracle Access Manager (OAM) environment, in response to the determining, wherein the first authorization policy specifies features of a role-based access control (RBAC) model including a role category to which multiple roles belong, and wherein the second authorization policy specifies features of a discretionary access control (DAC) model;
    evaluating the union of the first policy and the second policy within a policy engine that evaluates both features that are used within the first type of authorization environment and features that are used within the second type of authorization environment wherein evaluating the features that are used within the first type of authorization policy comprises determining whether an access-requesting subject is associated with a particular role that belongs to the role category; and
    granting access to at least one resource within the enterprise based on a result of the evaluating.

2. The method of claim 1, wherein the first type of authorization environment is a Java™ Platform Security (JPS) environment.

3. The method of claim 1, further comprising:
    storing, in the policy store, a hybrid authorization policy that specifies both (a) features that are used within the first type of authorization environment but not the second type of authorization environment and (b) features that are used within the second type of authorization environment but not the first type of authorization environment;
    querying the policy store to retrieve the hybrid policy from the policy store;
    evaluating the hybrid policy within the policy engine; and
    granting access to at least one resource within the environment based on a result of the evaluating of the hybrid policy;
    wherein the hybrid policy specifies at least one policy set, at least one role hierarchy, and at least one attribute constraint.

4. The method of claim 1, wherein: the first authorization policy and the second authorization policy both conform to a specified canonical format to which all policies stored in the policy store conform; and wherein the specified canonical format includes a field for a policy set, a field for a roles hierarchy, and a field for an attribute constraint.

5. The method of claim 1, wherein the first authorization policy specifies a resource type that the at least one resource possesses; and wherein the resource type is possessed by multiple separate resources.

6. A computer-readable storage memory storing particular instructions capable of causing one or more processors to perform specified operations, the particular instructions comprising:
    instructions to cause the one or more processors to store, in a policy store that is utilized by a plurality of applications in an enterprise, a first authorization policy that specifies features that are used within a first type of authorization environment;
    instructions to cause the one or more processors to store, in the policy store, a second authorization policy that specifies features that are used within a second type of authorization environment that differs from the first type of authorization environment;
    instructions to cause the one or more processors to determine that the first authorization policy and the second authorization policy in the policy store are relevant to a request from an application of the plurality of applications;
    instructions to cause the one or more processing to perform a union of the first authorization policy, configured for use within the first type of authorization environment, and the second authorization policy, configured for use within the second type of authorization environment, wherein the second type of authorization environment is an Oracle Access Manager (OAM) environment, wherein the first authorization policy specifies features of a role-based access control (RBAC) model including a role category to which multiple roles belong, and wherein the second authorization policy specifies features of a discretionary access control (DAC) model;

instructions to cause the one or more processors to evaluate the union of the first policy and the second policy within a policy engine that evaluates both features that are used within the first type of authorization environment and features that are used within the second type of authorization environment wherein evaluating the features that are used within the first type of authorization policy comprises determining whether an access-requesting subject is associated with a particular role that belongs to the role category; and instructions to cause the one or more processors to grant access to at least one resource within the enterprise based on a result of the evaluating.

7. The computer-readable storage memory of claim 6, wherein the first type of authorization environment is a Java™ Platform Security (JPS) environment.

8. The computer-readable storage memory of claim 6, wherein the particular instructions further comprise:

instructions to cause the one or more processors to store, in the policy store, a hybrid authorization policy that specifies both (a) features that are used within the first type of authorization environment but not the second type of authorization environment and (b) features that are used within the second type of authorization environment but not the first type of authorization environment;

instructions to cause the one or more processors to query the policy store to retrieve the hybrid policy from the policy store;

instructions to cause the one or more processors to evaluate the hybrid policy within the policy engine; and instructions to cause the one or more processors to grant access to at least one resource within the environment based on a result of the evaluating of the hybrid policy.

9. The computer-readable storage memory of claim 6, wherein the first authorization policy and the second authorization policy both conform to a specified canonical format to which all policies stored in the policy store conform.

10. The computer-readable storage memory of claim 6, wherein the first authorization policy specifies a resource type that the at least one resource possesses; and wherein the resource type is possessed by multiple separate resources.

11. A system comprising:
one or more processors; and
a computer-readable storage memory that stores:
a policy store that contains (1) a first authorization policy that specifies features that are used within a first type of authorization environment and (2) a second authorization policy that specifies features that are used within a second type of authorization environment that differs from the first type of authorization environment, wherein the second type of authorization environment is an Oracle Access Manager (OAM) environment, wherein the first authorization policy specifies features of a role-based access control (RBAC) model including a role category to which multiple roles belong, and wherein the second authorization policy specifies features of a discretionary access control (DAC) model; and executable code that represents a policy engine that is configured to perform a union of the first authorization policy and the second authorization policy and to evaluate the union by evaluating both features that are used within the first type of authorization environment and features that are used within the second type of authorization environment wherein evaluating the features that are used within the first type of authorization policy comprises determining whether an access-requesting subject is associated with a particular role that belongs to the role category.

12. The system of claim 11, wherein the first type of authorization environment is a Java Platform Security™ (JPS) environment.

13. The system of claim 11, wherein the policy store contains a hybrid authorization policy that specifies both (a) features that are used within the first type of authorization environment but not the second type of authorization environment and (b) features that are used within the second type of authorization environment but not the first type of authorization environment; and wherein the policy engine is configurable to evaluate the hybrid policy.

14. The system of claim 11, wherein the first authorization policy and the second authorization policy both conform to a specified canonical format to which all policies stored in the policy store conform.

15. The system of claim 11, wherein the first authorization policy specifies a resource type that the at least one resource possesses; and wherein the resource type is possessed by multiple separate resources.

* * * * *

UNITED STATES PATENT AND TRADEMARK OFFICE
CERTIFICATE OF CORRECTION

Page 1 of 1

PATENT NO. : 9,058,471 B2
APPLICATION NO. : 13/838113
DATED : June 16, 2015
INVENTOR(S) : Sastry et al.

It is certified that error appears in the above-identified patent and that said Letters Patent is hereby corrected as shown below:

Title page,

On page 2, column 2, Item (56) under other publications, line 19, delete "Idapsearch,"" and insert -- ldapsearch," --, therefor.

On page 3, column 1, Item (56) under other publications, line 42, delete "Orcale" and insert -- Oracle --, therefor.

In the Drawings,

On Sheet 8 of 9, in figure 8, under Reference Numeral 814, line 1, delete "POLICES" and insert -- POLICIES --, therefor.

In the Specification,

In column 3, line 31, after "can" delete "be be" and insert -- be --, therefor.

In column 5, line 23, delete "polices" and insert -- policies --, therefor.

In column 6, line 4, delete "polices" and insert -- policies --, therefor.

In column 20, line 38, delete "polices" and insert -- policies --, therefor.

Signed and Sealed this
Twelfth Day of April, 2016

Michelle K. Lee
*Director of the United States Patent and Trademark Office*